(12) United States Patent
Mirandola

(10) Patent No.: US 11,447,013 B2
(45) Date of Patent: Sep. 20, 2022

(54) DISPLAY PUSHBUTTONS SYSTEM, NETWORK, AND METHODS RELATING TO SAME

(71) Applicant: Racing Tech LLC, Grand Rapids, MI (US)

(72) Inventor: Fabrizio Mirandola, East Grand Rapids, MI (US)

( * ) Notice: Subject to any disclaimer, the term of this patent is extended or adjusted under 35 U.S.C. 154(b) by 0 days.

(21) Appl. No.: 17/313,681

(22) Filed: May 6, 2021

(65) Prior Publication Data
US 2021/0347263 A1 Nov. 11, 2021

Related U.S. Application Data

(60) Provisional application No. 63/021,076, filed on May 6, 2020.

(51) Int. Cl.
*B60K 37/06* (2006.01)

(52) U.S. Cl.
CPC ........ *B60K 37/06* (2013.01); *B60K 2370/139* (2019.05); *B60K 2370/1523* (2019.05); *B60K 2370/343* (2019.05); *B60K 2370/345* (2019.05); *B60K 2370/349* (2019.05); *B60K 2370/46* (2019.05)

(58) Field of Classification Search
CPC .............. B60K 37/06; B60K 2370/343; B60K 2370/349; B60K 2370/139; B60K 2370/1523; B60K 2370/345; B60K 2370/46; B60K 2370/1537; B60K 2370/128
See application file for complete search history.

(56) References Cited

U.S. PATENT DOCUMENTS

| 5,278,362 | A  | 1/1994 | Ohashi |
| 7,804,037 | B2 | 9/2010 | Cove |
| 8,129,640 | B2 | 3/2012 | Liao |
| 8,378,246 | B2 | 2/2013 | Chu |

(Continued)

OTHER PUBLICATIONS

Elgato Stream Deck webpage at https://www.elgato.com/en/stream-deck, downloaded May 6, 2021 and available at least as early as May 5, 2021.

(Continued)

*Primary Examiner* — Yaron Cohen
(74) *Attorney, Agent, or Firm* — Veln PLLC; Stephen J. Kontos

(57) ABSTRACT

A display pushbuttons system (DPS), network, and methods of using the same. The DPS connects to a vehicle controller area network (CAN) bus accessing and controlling vehicle functions. The DPS includes selectively activatable display pushbuttons. The DPS can be configured to display graphics stored in a memory on the display pushbutton screens. The DPS can be operated in active mode or passive mode. In active mode, a controller on the DPS receives CAN messages from vehicle function CAN nodes and can use that information to update the image, color, or brightness of the corresponding display pushbutton screens. In addition, activating a display pushbutton may alter a vehicle characteristic or function. In passive mode, the DPS control logic is provided elsewhere on the vehicle CAN bus by a node with access to the CAN dbc file and the DPS object so the DPS can be controlled.

19 Claims, 21 Drawing Sheets

(56) References Cited

U.S. PATENT DOCUMENTS

| | | |
|---|---|---|
| 8,558,130 B2 | 10/2013 | Verdú Martinez et al. |
| 9,195,365 B2 | 11/2015 | Williams |
| D753,069 S | 4/2016 | Ura |
| 10,368,125 B2 | 7/2019 | Wang et al. |
| D892,794 S | 8/2020 | Koo |
| D900,100 S | 10/2020 | Koo |
| 10,877,570 B1 | 12/2020 | Wilson |
| 2004/0117084 A1 | 6/2004 | Mercier et al. |
| 2009/0179854 A1 | 7/2009 | Weber et al. |
| 2011/0315533 A1 | 12/2011 | Chu |
| 2013/0217491 A1 | 8/2013 | Hilbert et al. |
| 2015/0083564 A1* | 3/2015 | Verd Martinez ....... H01H 9/181 200/5 A |
| 2015/0200062 A1 | 7/2015 | Ura |
| 2016/0239145 A1 | 8/2016 | Chang et al. |
| 2016/0254924 A1 | 9/2016 | Hartwich |
| 2020/0372877 A1* | 11/2020 | Weindorf ................. H04N 5/58 |
| 2021/0178900 A1* | 6/2021 | Sudoh .................... B60K 35/00 |

OTHER PUBLICATIONS

International Search Report and the Written Opinion of the International Searching Authority for International Application No. PCT/US2021/031067 dated Sep. 23, 2021.

\* cited by examiner

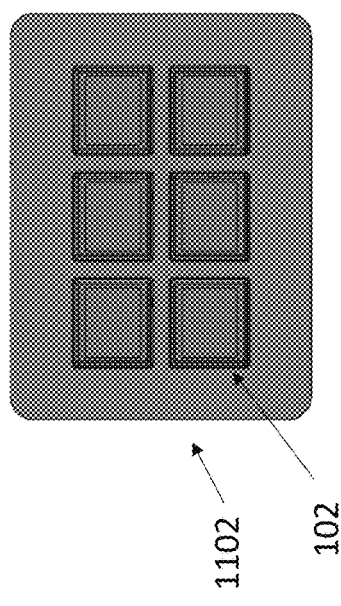
Fig. 11B
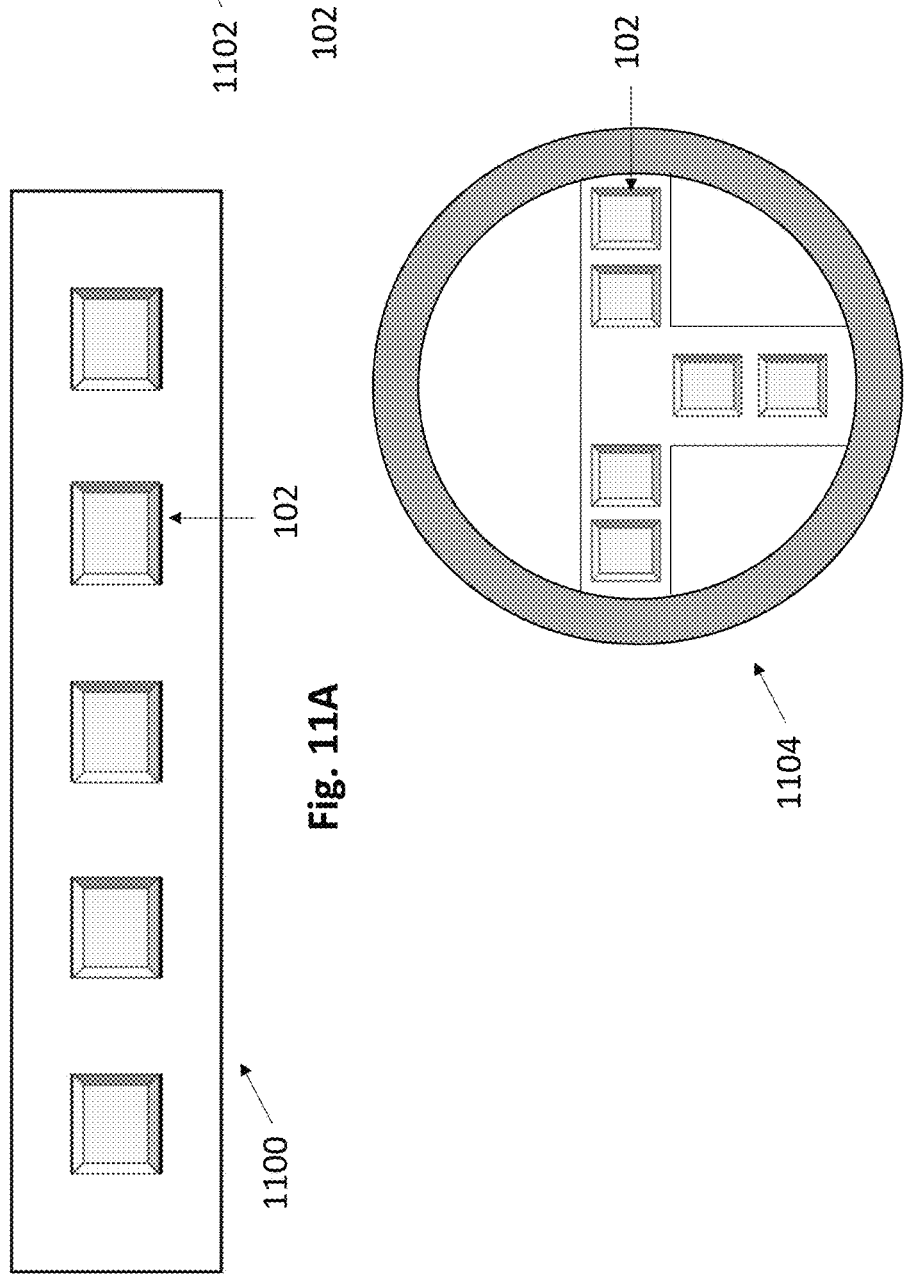
Fig. 11A
Fig. 11C

| ID | BYTE 0 | BYTE 1 | BYTE 2 | BYTE 3 | | BYTE 4 | BYTE 5 | BYTE 6 | BYTE 7 |
|---|---|---|---|---|---|---|---|---|---|
| 0x650 + Node ID | Write Cmd | CAN Obj 2021 | | Sub-index | Ext/Std | Extended CAN ID (29 bits) | | | Standard CAN ID |
| | | | | | 1 or 0 | | | | |
| | | | | | Not Used | | | | |
| | 2F | 21 | 20 | 1 | | | | | |

Fig. 18

| ID | BYTE 0 | BYTE 1 | BYTE 2 | BYTE 3 | BYTE 4 | BYTE 5 | BYTE 6 | BYTE 7 |
|---|---|---|---|---|---|---|---|---|
| | Write Cmd | CAN Obj 2021 | | Sub-Index | Enable/Disable (2 = One Shot, 1 = Enable, 0 = Disable) | Tx Type Mode (Fast/Extended Mode) | Tx Rate in ms | |
| 0x650 + Node ID | 2F | 21 | 20 | 2 | 2 or 1 or 0 | 2 or 1 | | |

Fig. 19

| 0x580 + Node ID | BYTE 0 | BYTE 1 | BYTE 2 | BYTE 3 | BYTE 4 | | | | | | | | BYTE 5 | | | | | | | | BYTE 6 | BYTE 7 |
|---|---|---|---|---|---|---|---|---|---|---|---|---|---|---|---|---|---|---|---|---|---|---|
| | Read Cmd | CAN Obj 2021 | | Sub-index | Switch State (1 = Pressed, 0 = Not pressed) | | | | | | | | Page Number (0x00 to 0xFF) | | | | | | | | Light Sensor (LUX) (0x000 to 0xFFF) | |
| | | | | | S7 | S6 | S5 | S4 | S3 | S2 | S1 | S0 | | | | | | | Rotary State (Press, CW, CCW) | | | |
| | | | | | | | | | | | | | | | | | | | P | CW | CCW | Not Used | |
| | 40 | 21 | 20 | 3 | | | | | | | | | | | | | | | | | | | |

Fig. 20

| | BYTE 0 | BYTE 1 | BYTE 2 | BYTE 3 | BYTE 4 | BYTE 5 | BYTE 6 | BYTE 7 |
|---|---|---|---|---|---|---|---|---|
| 0x580 + Node ID | Read Cmd | CAN Obj 2021 | | Sub-index | Image 1 | Image 2 | Image 3 | Image 4 |
| | 43 | 21 | 20 | 4 | 0x00 to 0xFF (0 to 255) | 0x00 to 0xFF (0 to 255) | 0x00 to 0xFF (0 to 255) | 0x00 to 0xFF (0 to 255) |

| | BYTE 0 | BYTE 1 | BYTE 2 | BYTE 3 | BYTE 4 | BYTE 5 | BYTE 6 | BYTE 7 |
|---|---|---|---|---|---|---|---|---|
| 0x580 + Node ID | Read Cmd | CAN Obj 2021 | | Sub-index | Image 5 | Image 6 | Image 7 | Image 8 |
| | 43 | 21 | 20 | 5 | 0x00 to 0xFF (0 to 255) | 0x00 to 0xFF (0 to 255) | 0x00 to 0xFF (0 to 255) | 0x00 to 0xFF (0 to 255) |

| | BYTE 0 | BYTE 1 | BYTE 2 | BYTE 3 | BYTE 4 | BYTE 5 | BYTE 6 | BYTE 7 |
|---|---|---|---|---|---|---|---|---|
| 0x580 + Node ID | Read Cmd | CAN Obj 2021 | | Sub-index | SW0 Brightness | SW1 Brightness | SW2 Brightness | SW3 Brightness |
| | 43 | 21 | 20 | 6 | 0x0 - 0x7 | 0x0 - 0x7 | 0x0 - 0x7 | 0x0 - 0x7 |
| | | | | | SW0 Color | SW1 Color | SW2 Color | SW3 Color |
| | | | | | 0x0 - 0x7 | 0x0 - 0x7 | 0x0 - 0x7 | 0x0 - 0x7 |

| | BYTE 0 | BYTE 1 | BYTE 2 | BYTE 3 | BYTE 4 | BYTE 5 | BYTE 6 | BYTE 7 |
|---|---|---|---|---|---|---|---|---|
| 0x580 + Node ID | Read Cmd | CAN Obj 2021 | | Sub-index | SW4 Brightness | SW5 Brightness | SW6 Brightness | SW7 Brightness |
| | 43 | 21 | 20 | 7 | 0x0 - 0x7 | 0x0 - 0x7 | 0x0 - 0x7 | 0x0 - 0x7 |
| | | | | | SW4 Color | SW5 Color | SW6 Color | SW7 Color |
| | | | | | 0x0 - 0x7 | 0x0 - 0x7 | 0x0 - 0x7 | 0x0 - 0x7 |

Fig. 21

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | Image 1 | | Image 2 | |
| 43 | 21 | 20 | 4 | 0x0000 to 0xFFFF (0 to 65535) | | 0x0000 to 0xFFFF (0 to 65535) | |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | Image 3 | | Image 4 | |
| 43 | 21 | 20 | 5 | 0x0000 to 0xFFFF (0 to 65535) | | 0x0000 to 0xFFFF (0 to 65535) | |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | Image 5 | | Image 6 | |
| 43 | 21 | 20 | 6 | 0x0000 to 0xFFFF (0 to 65535) | | 0x0000 to 0xFFFF (0 to 65535) | |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | Image 7 | | Image 8 | |
| 43 | 21 | 20 | 7 | 0x0000 to 0xFFFF (0 to 65535) | | 0x0000 to 0xFFFF (0 to 65535) | |

0x680 + Node ID

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | SW0 Color | SW1 Color | SW2 Color | SW3 Color |
| 43 | 21 | 20 | 8 | 0x00 to 0xFF (0 to 255) | 0x00 to 0xFF (0 to 255) | 0x00 to 0xFF (0 to 255) | 0x00 to 0xFF (0 to 255) |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | SW4 Color | SW5 Color | SW6 Color | SW7 Color |
| 43 | 21 | 20 | 9 | 0x00 to 0xFF (0 to 255) | 0x00 to 0xFF (0 to 255) | 0x00 to 0xFF (0 to 255) | 0x00 to 0xFF (0 to 255) |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | SW0 Brightness | SW1 Brightness | SW2 Brightness | SW3 Brightness |
| 43 | 21 | 20 | 10 | 0x00 to 0xFF (0 to 255) | 0x00 to 0xFF (0 to 255) | 0x00 to 0xFF (0 to 255) | 0x00 to 0xFF (0 to 255) |

| BYTE 0 | BYTE 1 | BYTE 2 | BYTE 3 | BYTE 4 | BYTE 5 | BYTE 6 | BYTE 7 |
|---|---|---|---|---|---|---|---|
| Read Cmd | CAN Obj 2021 | | Sub-Index | SW4 Brightness | SW5 Brightness | SW6 Brightness | SW7 Brightness |
| 43 | 21 | 20 | 11 | 0x00 to 0xFF (0 to 255) | 0x00 to 0xFF (0 to 255) | 0x00 to 0xFF (0 to 255) | 0x00 to 0xFF (0 to 255) |

0x680 + Node ID

Fig. 22

DISPLAY PUSHBUTTONS SYSTEM, NETWORK, AND METHODS RELATING TO SAME

BACKGROUND OF THE INVENTION

The present invention relates to configurable user interface display switches and related components for use with vehicle CAN networks.

It is common practice in motorsport vehicles to strip components out of the vehicle interior to optimize performance, typically seeking weight reduction. For example, door panels, various instrument clusters, vehicle consoles, and the dashboard often add unnecessary weight to a vehicle that can be deleted. Some of these components, such as the speedometer, tire pressure gauge, oil pressure gauge, and other gauges may be vital to functional operation of the vehicle for some drivers, but are often bulky. Other components may not be as vital to operation, such as a cabin temperature gauge and interface, and are difficult to justify leaving in place in the vehicle interior from a motorsport perspective due to their weight and footprint. However, the quality of life features associated with such components would be welcome by many drivers if the functionality could be provided in a sufficiently low-weight and compact form factor. Accordingly, replacement vehicle interfaces that provide such vital and/or quality of life features without sacrificing a disproportionate amount of vehicle performance are desirable.

Historically, keypad interfaces have attempted to fill this need. Conventional keypad systems can be installed in various vehicle locations to provide certain functions to a driver or passenger. For example, a keypad interface and be installed on or at the center console and/or vehicle dashboard. Traditional keypad systems utilize an array of keys with pre-defined functions arranged in a pre-defined pattern. The keys are often topped with a sticker or other permanent indicator to show their assigned function. These systems lack modularity and configurability as the driver cannot assign keys with desired functions to desired locations on the keypad or add new functions to the keypad. Additionally, a vehicle often may require multiple keypads be installed because the number of desired controllable functions exceeds the number of keys available per keypad and each key can only have one function. Further, the keypad interfaces only tackle half of the aforementioned issues because they do not provide feedback to the driver. Typically a separate custom display panel must be provided in addition to any keypad interfaces so that the driver can receive feedback from the vehicle.

SUMMARY OF THE INVENTION

The present invention provides a display pushbuttons system (DPS). In one embodiment, a DPS may be included as one controller area network (CAN) node in a larger vehicle CAN. The vehicle CAN may include a vehicle CAN bus and a plurality of vehicle function CAN nodes that communicate physical values associated with the vehicle. The DPS may have a plurality of display pushbuttons and that each display a graphic. The DPS may include a graphics memory configured to store a plurality of display pushbutton graphics at different memory addresses. A CAN transceiver can be included in the DPS to receive, decode, encode, and transmit CAN frames. The vehicle CAN may include event memory configured to store DPS update event trigger criteria and DPS update event information. The vehicle CAN may have a controller configured to trigger a DPS update event based on a comparison between the DPS update event trigger criteria and physical values associated with the vehicle. The controller can be configured to select, in response to the DPS update event, one of the plurality of display pushbutton graphics stored in the graphics memory for each of the plurality of display pushbuttons based on the DPS update event information. The controller can be configured to initiate a graphics update of the plurality of display pushbuttons based on the selected graphics. In one embodiment, the controller and the event memory may be included in the DPS. In an alternative embodiment, the controller may be a separate CAN node on the vehicle CAN.

In one embodiment, a passive mode DPS can be used as a user interface (UI) in a vehicle having a vehicle CAN bus. The DPS may include a housing and a plurality of display pushbuttons at least partially disposed in the housing. Each of the display pushbuttons may include a display and a pushbutton. The display pushbuttons can be configured to receive input data for configuring their respective displays and can generate output data associated with the activation of the respective pushbuttons. The DPS may include a CAN transceiver disposed in the housing. The CAN transceiver can be configured for receiving communication over the vehicle CAN bus from a CAN-side DPS control CAN node and the CAN transceiver can be configured to transmit and receive CAN frames. The DPS may include a CAN controller disposed in the housing. The CAN controller may be configured to encode outgoing CAN data into a CAN frame for transmission over the vehicle CAN bus via the CAN transceiver, and the CAN controller may be configured to decode CAN data from CAN frames received over the vehicle CAN bus from the CAN-side DPS control CAN node. The DPS may include a local memory disposed in the housing, and the local memory may store a plurality of display pushbutton images at a plurality of memory locations successively offset by a pre-defined offset amount of memory. The DPS can include a local controller disposed in the housing. The local controller may be configured to receive decoded CAN data including a series of image index values whose position in the series dictates a corresponding display pushbutton of the plurality of display pushbuttons. The local controller may calculate a corresponding memory address for each image index based on the value of the image index and the pre-defined offset amount of memory. The local controller can assign the display pushbutton images located at the corresponding memory addresses to the plurality of display pushbuttons based on the position in the series of image index values in the decoded CAN data. The local controller can update the displays of the plurality of display pushbuttons with the display pushbutton images located at the corresponding memory addresses according to the assignments.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 11A-C illustrate several exemplary embodiments of a DPS user interface.

FIG. 18 illustrates a service data objects (SDO) message for initializing a DPS on a vehicle CAN network according to one embodiment.

FIG. 19 illustrates an SDO message for initializing a DPS on a vehicle CAN network according to one embodiment.

FIG. 20 illustrates one of a pair of SDO messages for requesting and providing a current switch status, current page number, current status of a rotary encoder, and current status of a light sensor in terms of a LUX value according to one embodiment.

FIG. 21 illustrates four SDO messages that give the current status of the DPS (feedback) in fast mode according to one embodiment.

FIG. 22 illustrates eight SDO messages that give the current status of the DPS (feedback) in extended mode according to one embodiment.

DESCRIPTION OF THE CURRENT EMBODIMENT

Figure 1:
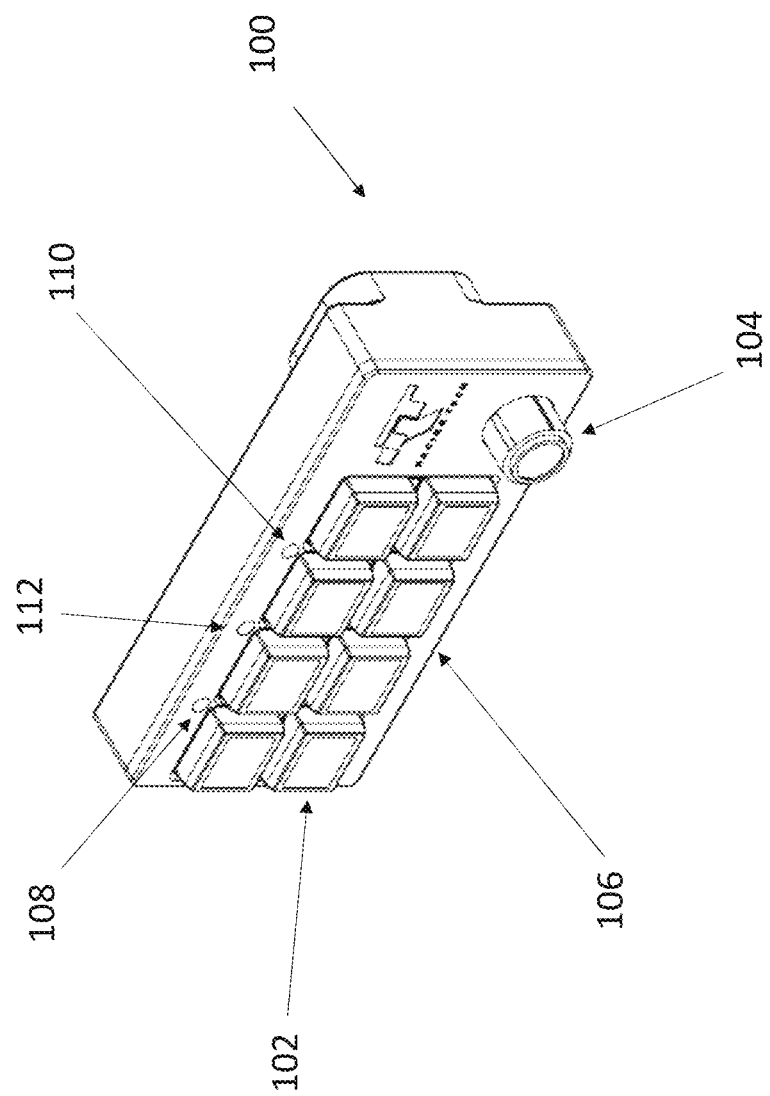
FIG. 1 illustrates a perspective view of a display pushbuttons system (DPS) according to one embodiment.

The present disclosure is generally directed to display pushbuttons systems (DPSs) and associated networks, as well as various methods relating to operation of the DPS and networked devices. In general, the present disclosure provides a user interface of physically actuable display pushbuttons that are capable of dynamic configuration, e.g. that change images, colors, brightness, and characters on the display pushbuttons or change other aspects of the DPS components based on desired user functionality defined in a set of event trigger criteria stored in memory. The DPS configuration adapts in response to triggered events. Events can be triggered by comparing internal (i.e. from a DPS sensor) or external (e.g. vehicle CAN bus data) sensor output to event trigger criteria.

In general, a DPS includes multiple activatable pushbuttons each with a separate display or screen. Collectively, the display pushbuttons can form a user interface (UI). The UI can include additional components of the DPS as well, such as one or more rotary encoders, LEDs separate from any included in the display pushbuttons themselves, or any combination thereof. The UI can be configurable (e.g. via a configuration interface available on another device that communicates with the DPS via a wired or wireless connection) and can be dynamically updated based on a variety of different criteria.

Some embodiments of the present disclosure are generally directed to a DPS installed as a node of a controller area network (CAN) along with other vehicle CAN nodes. For example, the DPS can provide a vehicle user interface and be installed on a vehicle CAN such that the vehicle user interface can display information received from various vehicle CAN nodes and request particular vehicle functionality from various vehicle CAN nodes.

Some embodiments of the DPS include a rotary encoder. In one configuration, the rotary encoder is configured to provide both UI virtual page selection and pushbutton specific functionality. That is, where no pushbutton display button is activated, rotation of the rotary encoder changes the pushbutton display graphics and functionality to a different set of pushbutton display graphics and functionality corresponding to the amount of rotation of the rotary encoder. The different sets of pushbutton display graphics and functionality can be referred to as virtual UI pages. Accordingly, rotation of the rotary encoder causes the display pushbuttons to scroll through the different virtual UI pages. In this way, the pushbutton displays are not confined to a rigid set of graphics and functions. Instead, the display pushbuttons can dynamically take on multiple functions despite their relatively small dimensions. For example, the pushbuttons may show different values on the different UI pages, the colors of the pushbuttons may be assigned according to a certain status or feedback, all while providing a compact form factor. Where a pushbutton display button is activated, rotation of the rotary encoder can change from altering the virtual UI page of the DPS to providing functionality associated with the activated button. For example, where the display pushbutton is associated with driver-side cabin temperature, clockwise rotation of the rotary encoder may correspond to a request to increase driver-side cabin temperature while counter-clockwise rotation may correspond to a request to decrease driver-side cabin temperature. Rotation of the rotary encoder may also cause a numerical value overlaid on a temperature graphic of the activated display pushbutton to change or be updated based on the actual driver-side cabin temperature provided over the vehicle CAN bus.

In embodiments that do not include a rotary encoder, such as in the DPS embodiments depicted in FIGS. 11A-C, UI virtual page selection can be provided by two external buttons. For example, two external buttons can be provided around and extend through the peripheral edge of the housing to allow a user to easily switch pages of the UI. That is, the buttons can change the pushbutton display graphics and functionality to a different set of pushbutton display graphics and functionality. The different sets of graphics and functionality can be provided in an indexed loop where pressing one button traverses the loop of UI pages in one direction and pressing the other button traverses the loop of UI pages in another direction. In some embodiments, additional or fewer UI page change buttons may be provided. For example, a one button embodiment may start at the beginning of the UI pages after the last page. Such buttons can be especially useful when the number of display pushbuttons is relatively low compared to the total number and utilizing some of the display pushbuttons to provide page change functionality would monopolize a large percentage of the available display pushbuttons. Pushbutton specific functionality can also be provided by the same one or more buttons, or by a separate set of one or more buttons. For example, the pushbutton specific functionality can be provided by adjusting a characteristic associated with a selected display pushbutton, e.g. a cabin temperature value or other adjustable vehicle parameter adjustable by command over the vehicle CAN.

As mentioned above, the DPS can provide a configurable and dynamic user interface (UI) that can display information received over a network, such as a vehicle CAN network. Each pushbutton can be individually configured to display various graphics including colors, characters, images, and brightness and the UI can be configured to associate one or more different functions with each pushbutton. Further, the UI can include information to a user to control a machine or other apparatus by indicating data, colors, or the combination of both. For example, a DPS can be used in a vehicle such as a motorsport vehicle. In alternative embodiments, the DPS can include other types and form factors of displays in addition to the display pushbuttons. For example, one or more screens or displays can be included and integrated into the UI provided by the DPS. Such screens can form part of a heads up display for the vehicle.

The display pushbuttons can be commanded (e.g. to configure or request status/feedback) via a controller coupled to a display pushbutton control interface, which can include one or more display pushbutton control terminals for I/O. The display pushbuttons can provide display pushbutton feedback via the control interface to the controller. A controller, such as MCU 602 in FIG. 6, can update the display pushbuttons. This can include updating one or more of display pushbutton color, image, character, numerical value, text, configuration, or any other display pushbutton characteristic, or any combination thereof.

The local DPS controller can request status information (also referred to as feedback) from various internal and external sources. Internal feedback from the DPS itself can include information such as the last image displayed on each display pushbutton, DPS current page number, press status of each display pushbutton, rotary status information, DPS sensor output, and other DPS information, or combination thereof. External feedback from the DPS can include receiving vehicle CAN data relating to essentially any vehicle function information that is provided over the vehicle CAN bus, either automatically by a CAN node or based upon a request from another CAN node.

Various different events can be triggered based on different event trigger criteria. In some embodiments, the events can either be (1) command events that, when triggered, result in a command being initiated. Exemplary command events can include commands to change DPS graphics, DPS functionality, DPS configurations, vehicle functionality, vehicle configurations, or any combination thereof; or (2) status request events that, when triggered, result in a status request being initiated. Exemplary status request events can include status requests for display pushbutton information, DPS sensor information, vehicle information (e.g. static, sensor, or configuration information), or other types of feedback.

A myriad of different conditions can be utilized as event trigger criteria. The event trigger criteria can be stored in memory. The event trigger criteria format and content can vary from application to application, but in general the event trigger criteria includes one or more conditions along with one or more events (command or status request) triggered by the event trigger criteria being met. A controller, for example controller 602 or a CAN-side DPS control CAN node 400, can be configured to execute instructions to determine if an event trigger criteria is met and can manage triggering corresponding events, either by executing instructions associated with the event or sending instructions to another device to execute instructions associated with the vent. The event trigger criteria can include multiple conditions and multiple events. Some event trigger criteria is associated with status request events that are executed to periodically or continuously receive information to utilize in connection with determining whether or not the event the trigger criteria is met. For example, the event trigger criteria can include various conditions and thresholds associated with certain sensor values or combination of sensor values. In order to evaluate the event trigger criteria, a status request event can be executed by the controller to ensure suitable information is available to evaluate the event trigger criteria.

By way of example, an event trigger criteria may be active that relies on vehicle speed, which is available from a vehicle CAN node on the CAN bus but otherwise not available to the controller monitoring the event trigger criteria. Accordingly, the controller can be configured to carry out a status request event that periodically or continually requests, observes, or otherwise obtains the vehicle speed. Then, as the vehicle accelerates to different speeds, the controller compares the vehicle speed according to the criteria (e.g. different threshold speeds) triggering a corresponding command event that initiates an update to the display pushbutton graphics. For example, at a certain threshold speed a graphic associated with low speed may be updated to a graphic associated with medium or high speed, a pushbutton display LED color may be updated from a color associated with a low speed to a color associated with a high speed, a pushbutton display text overlay may change the updated graphic as the speed values change to display the speed values or some other text associated therewith, or a turbo button graphic may replace a certain display pushbutton graphic at a threshold speed and change the functionality of pressing that display pushbutton to initiate a command event for activating a turbo mode, to name a few examples. As is evident, there are numerous combinations of different events and event criteria that can dynamically change how the DPS operates—changing the DPS aesthetics, functionality, and configuration and changing the various status/feedback that the DPS collects.

Referring to FIGS. 1-5, a display pushbuttons system (DPS) 100 in accordance with an embodiment of the present disclosure is illustrated and will now be descried in detail. FIG. 1 illustrates a perspective view of an exemplary DPS 100. The DPS may be referred to as a DPS assembly, DPS unit, generally as a user interface, or by any other suitable name. The DPS 100 may include two or more display pushbuttons 102 at least partially disposed in a housing 106. The display pushbuttons 102 may also be referred to as switches or another suitable name. As depicted, the DPS 100 includes eight display pushbuttons 102. In alternative embodiments, the DPS 100 may include additional, fewer, or a different number of display pushbuttons 102.

Each display pushbutton 102 may each include a pushbutton display (also referred to as a screen), an input interface configured to provide various input to the display pushbutton (e.g. power and data), and an output interface configured to provide output from the display pushbutton (e.g. pushed status). In one embodiment, the display pushbutton screen can be an active liquid-crystal display (LCD) module. An active LCD module includes an LCD and a backlight, both of which can be controlled via the display pushbuttons input interface. For example, the input interface may include data input terminals for the LCD (e.g. terminals to provide RGB values and pixel on/off values) and for the backlight. Alternative embodiments can have input and output interfaces with different configurations and different numbers of terminals or other types of input and output interfaces entirely. While LCD display pushbuttons are utilized in the depicted embodiment, other types of display pushbuttons may be utilized in alternative embodiments. That is, essentially any suitable type of dynamically configurable display pushbuttons may be used.

Display pushbutton state can be provided over an I/O interface, such as an output terminal. However, some switches do not include memory for remembering their state after a change. Supplemental control logic can be stored in memory and utilized by a controller in order to store and track multiple states for each display pushbutton. For example, after a button is pressed, information about the function associated with the button press can be stored in memory and influence functionality of future button presses. For example, one implementation of this involves using momentary switch hardware to implement software switch latching, which will now be discussed in more detail below.

The display pushbuttons may be configured as temporary pushbuttons with two states: on and off. Typically, when a momentary pushbutton switch is temporarily pushed, the output terminal associated with the switch status provides a momentary signal change indicative of being pushed (e.g. a voltage signal above or below a threshold level is output) then, the voltage returns to the un-pushed level upon release of the button. This effectively provides a switch that toggles between on when the button is pressed and off when the button is not pressed (or vice versa). However, a momentary switch generally has no record of its previous state. This in contrast to switches with a hardware latching switch configuration, which maintains its state after being activated. Push to make and push to brake switches are examples of such switches where the hardware configuration is such that each time they are actuated, whichever state the switch is let in will persist until the switch is actuated again.

While latching display pushbutton switches can be utilized instead of momentary display pushbutton switches in a DPS to provide latching functionality, this would not meet user desires for selective configurability. Such latching functionality can be provided selectively with software switch latching of the present disclosure. Software switch latching allows dynamic configuration on a per switch basis of a set of momentary configured hardware switches between a momentary configuration and a software switch latching configuration based on whatever functionality is desired, e.g. as defined by event trigger criteria. That is, a DPS user interface can be provided where each switch selectively behaves as a momentary switch or a latching switch, using the same hardware. In essence, with software switch latching in response to a temporary pushbutton switch being pressed, the switch acts as normal providing a status output indicative of being pressed (e.g. status output 0 on the status output terminal of the output interface) and a status output indicative of not being pressed for other times (e.g. status output 0 on the status output terminal of the output interface). In software switch latching configuration, a controller stores the output state of the switch and further presses of that switch are routed through a control logic that includes reference to the previously stored output state. For example, a second, subsequent press of the button will again provide an output signal indicative of being pressed, but before providing that output, the controller compares the output to the previously stored output state of the switch and recognizes that the switch output was latched to on and changes the switch output to a latched off state, saving the off or zero state in memory for comparison the next time the switch is activated. In this way, a temporary or momentary hardware switch can be configured with software to act as a latching switch.

Various different types of latching functionality of the display pushbuttons can be implemented via software involving storing and controlling the respective switch states after being activated. As pushbuttons are triggered, the output of the switch can dynamically be changed by the controller to match the software functionality, e.g. whenever a particular event is triggered by pressing a display pushbutton, the controller can modify the actual output provided by the hardware switch based on software switch latching functionality to change its status according to a configuration stored in memory, e.g. to move from a current status to a next status, instead of passing through the hardware status. Different functionalities can be implemented for each status as well. Other software switching configurations can be utilized to provide additional behavior. For example, a three way latching switch can be similarly tracked by storing a multi-state switch relationship in memory and each time the controller receives an indication of the button being pressed the switch changes to the next state in the multi-state switch relationship defined in memory. The switch configurability need not be provided only for temporary or momentary switches. Other types of switches can have their functionality changed in software as well. For example, a latching switch can be converted to a temporary or momentary switch in memory in a similar fashion by utilizing a controller to compare switch output to store the previous state in memory and output an on signal in response to the comparison between the output terminal and the saved state being different and an off signal in response to a comparison between the output terminal and the saved state being the same.

Further, because the switches are display pushbutton switches, the look and feel (e.g. graphics, text, color, and brightness) can be dynamically adapted depending on the switch configuration to provide a consistent and robust user experience. Further, in some embodiments, piezoelectric or other force feedback devices can be utilized to provide a different user experience depending on the switch configuration. For example, in some embodiments a simulated latching switch user experience can be provided by configuring force feedback elements associated with the display pushback switch in response to a software latching switch configuration.

The DPS 100 may include a rotary encoder 104. The DPS can be embedded with one or more absolute or incremental rotary encoders or a combination of both. The controller can be configured to provide different functionality in response to pressing the encoder, rotating the encoder clockwise and rotating the encoder counterclockwise. Angular absolute position can be measured using absolute rotary encoders and distance, speed, and position can be measured using incremental rotary encoders. In some embodiments the encoder position can be programmed to change the page and access various different functions.

Software stored in memory can define different feedback configurations for the encoder counter based on the encoder physical motion and the amount adjusted during a factor or user calibration. For example, in some embodiments, there are three settings: fine counter, medium counter, and coarse counter.

The rotary encoder fine counter configuration provides high resolution accuracy with one counter increment per one rotary step. This can be provided on an application by application basis. This particular configuration can be suitable for use in applications such as changing pages, changing numbers, and changing colors in a normal condition.

The rotary encoder medium counter configuration provides about one counter increment per three rotary steps. This can be used in some of the applications such as when the user wants to increase the rpm of the car while driving. Increasing rpm with a finer counter configuration can create issues related to acceleration of the car.

The rotary encoder coarse counter configuration provides one counter increment per about twelve rotary steps. By way of example, this can be used in an application when a racing car is traveling at a high or maximum speed and driver is not able to reliably and confidently rotate the encoder properly due to vibration. This counter configuration provides extra time to perform the particular operation.

The depicted embodiment of the DPS 100 includes two light emitting diodes (LEDs) 108, 110 that act as indicator status lights. In alternative embodiments, the DPS 100 may include additional, fewer, or different types of indicator light sources. The LEDs 108, 110 may be domed LED light tubes or another type of LED or light source. The LEDs may be addressable or non-addressable. The LEDs of the current embodiment are configured to extend through the housing and provide status indications about the DPS. In alternative embodiments additional LEDs may be disposed about the housing, for example an internal surface of the housing to provide aesthetically pleasing lighting effects that may or may not be controlled in concert with other aspects of the DPS UI. That is, the LEDs in some embodiments of the present disclosure are embedded addressable RGB LEDs that can be activated to provide functionality including indication of a particular color (status) and brightness (status). The color and brightness of the RGB LEDs can be changed by essentially any external or internal DPS event. The LEDs can be selectively controlled via a microcontroller and accessed by pointing the software application stored in memory that includes the control logic to the pre-defined address of a particular LED during the active or passive state of DPS.

Additionally, or alternatively, the DPS 100 may include one or more sensors 112. In one embodiment, the sensor 112 may be a flat light tube. In the depicted embodiment, the sensor 112 can act as an ambient light sensor, proximity sensor, gesture light sensor, or any combination thereof. For example, a controller can obtain measurements from the light sensor 112 and be configured to interpret the measurements to determine an ambient light level light, determine whether an object has moved in proximity to the DPS, or whether a specific sequence of movements (i.e. a user gesture) has occurred. Although the depicted DPS includes one sensor 112, in alternative embodiments, additional sensors, different types of sensor(s), or no sensor may be included in the DPS.

Exemplary sensors that can be utilized in accordance with embodiments of the present disclosure can include one or more analog, digital, active, passive, electric, biological, chemical, photoelectric, thermoelectric, electrochemical, electromagnetic, thermo-optic sensor, or essentially any other type sensor. In the current embodiment, the DPS includes a proximity, light, RGB, and gesture all-in-one sensor. In particular, such a sensor is available as APDS9960 from an Avago Technologies. The sensor is an all-in-one sensor capable of one or more of gesture sensing, RGB color sensing, proximity sensing, ambient light sensing, or any combination thereof. In alternative embodiments separate sensor components may be provided instead of an all-in-one sensor.

By providing internal sensors in the DPS, various event trigger criteria can be based at least in part on the value of the sensor output such that certain commands and functionality relating to changes to features such as color, brightness, and image can be influenced, if desired, based on locally sensed values, such as ambient light level. That is, the DPS local controller can make adjustments responsive to the sensor output during active or passive state of the DPS.

Figure 2:
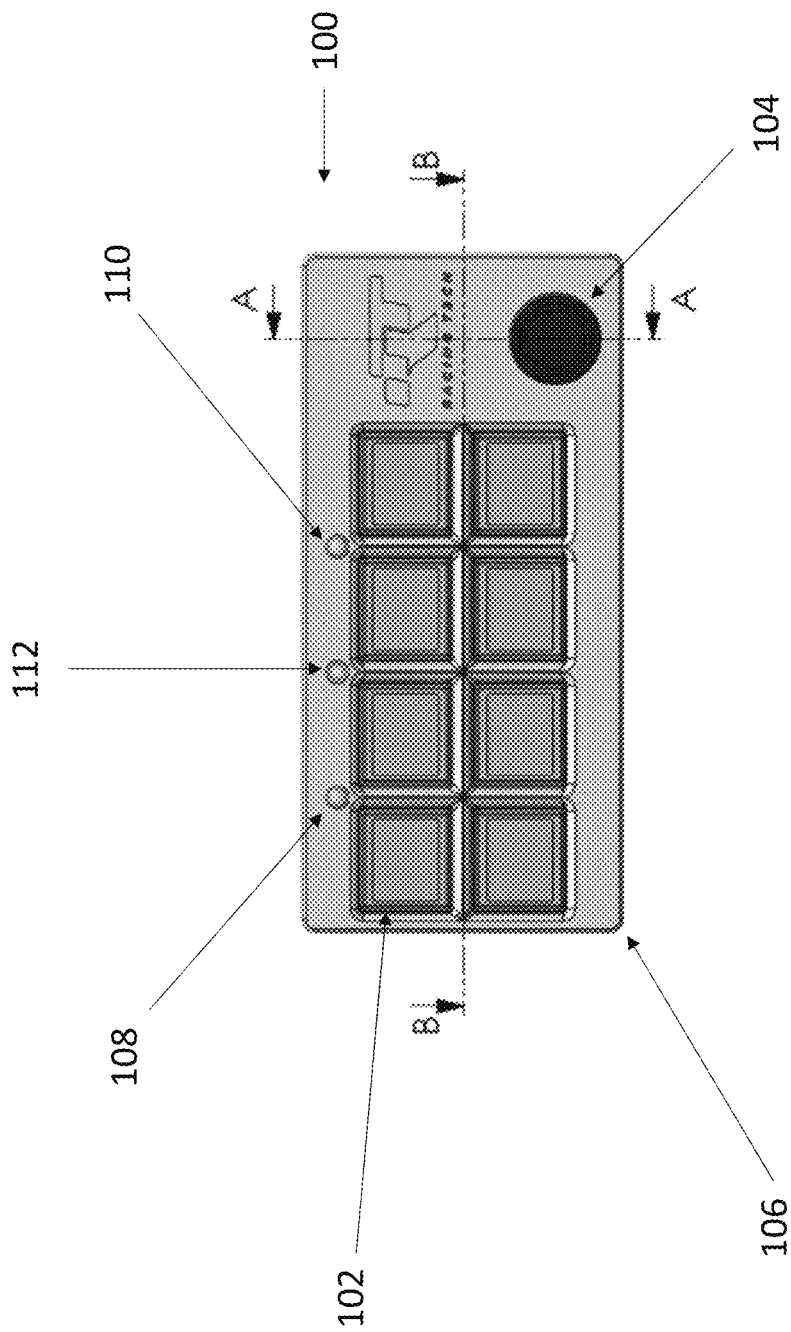
FIG. 2 illustrates a front view of the DPS of FIG. 1.
Figure 3:
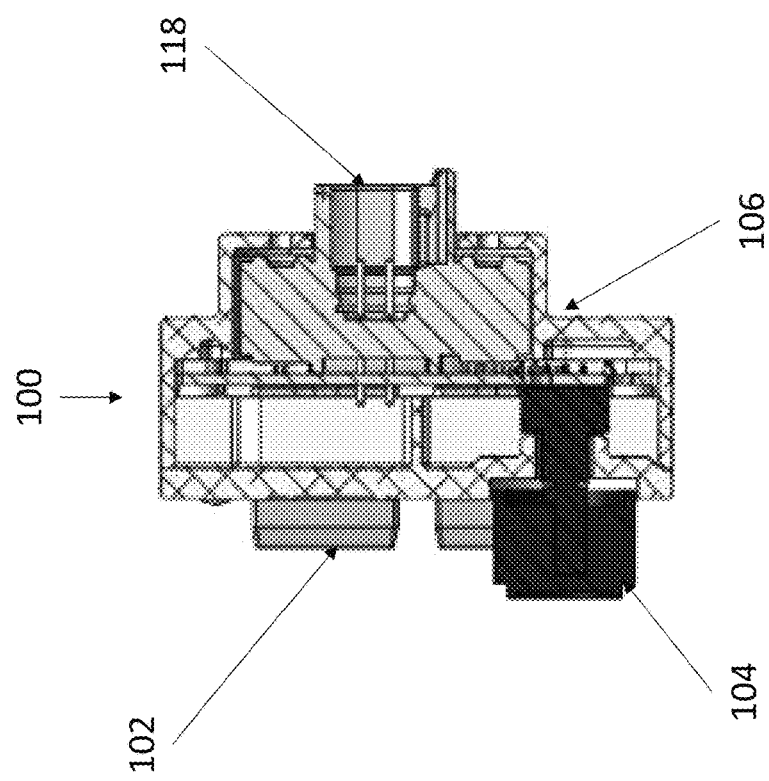
FIG. 3 illustrates a sectional view of the DPS along line A-A.
Figure 17:
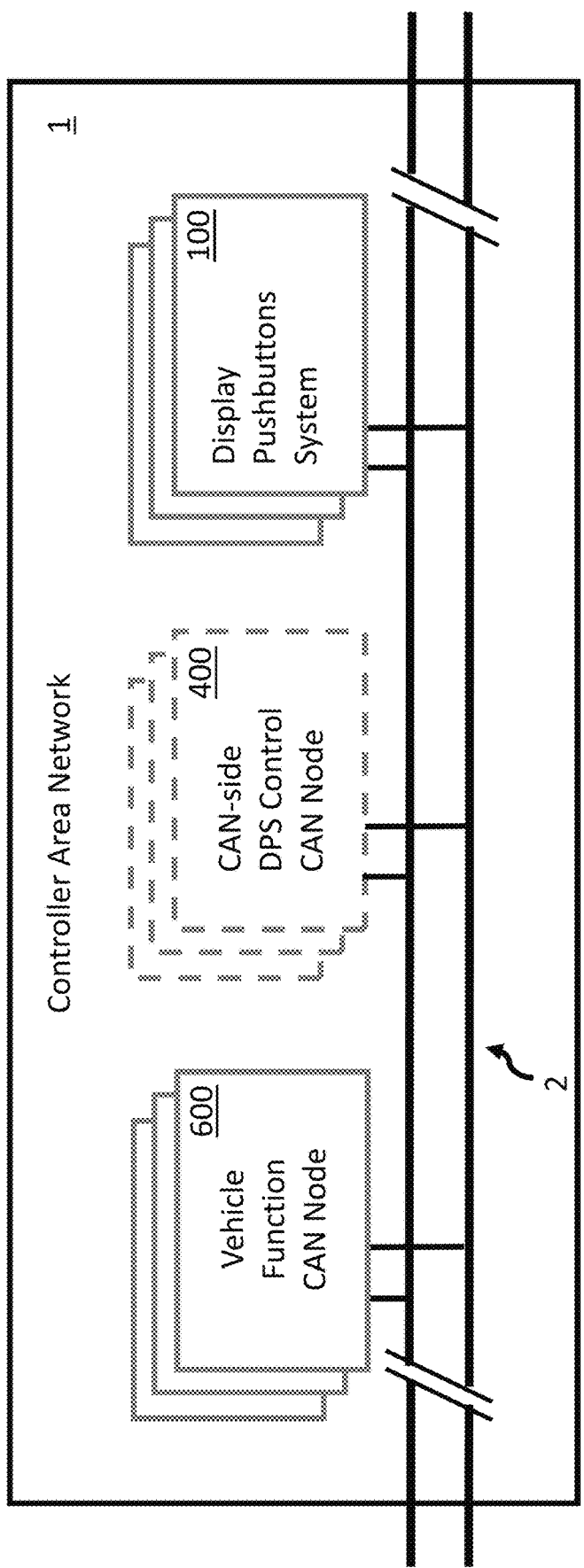
FIG. 17 illustrates a controller area network (CAN) in accordance with certain embodiments of the present disclosure.

FIG. 3 shows a sectional side view of the DPS 100 of FIGS. 1-2 along the line A-A. The DPS 100 further include a controller area network (CAN) bus connector 118 disposed at the housing 106 for connecting the DPS 100 to a CAN bus, such as a vehicle CAN bus. Instead of a CAN connector, the DPS 100 may be directly wired from the DPS to the CAN bus via a wired connection or selectable connector(s). The connection between the DPS 100 and the vehicle CAN bus allows the DPS 100 to communicate over the vehicle CAN bus with other vehicle CAN bus nodes, perhaps as best shown in FIG. 17.

Figure 4:
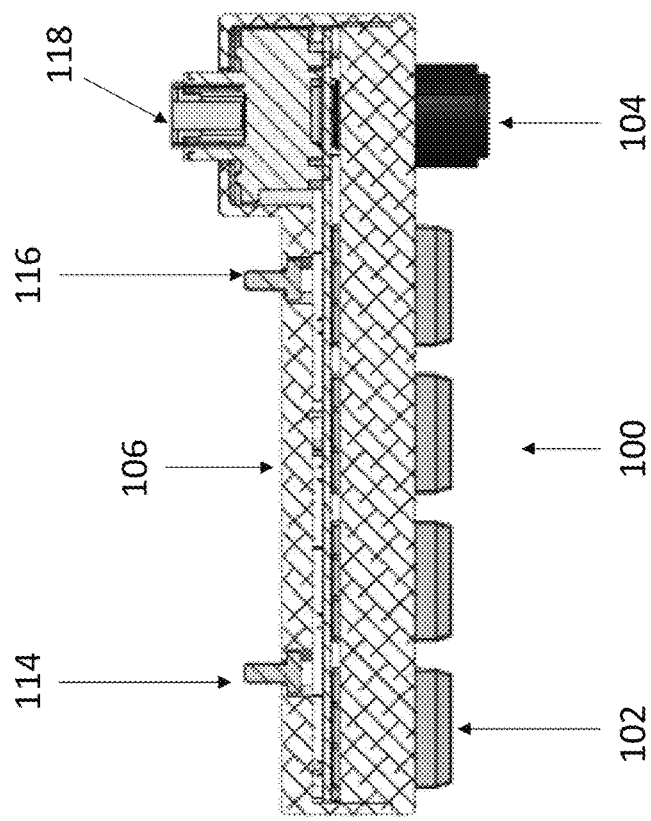
FIG. 4 illustrates a sectional view of the DPS along line B-B.

FIG. 4 shows a top sectional view of the DPS 100 of FIGS. 1-2 along the line B-B. This view illustrates how the depicted embodiment of the DPS 100 can be mounted in a vehicle. As depicted, two fasteners 114, 116 may be installed at the housing 106 to mount the DPS 100 to the vehicle. In particular, the fasteners 114, 116 may be screws that extend through an outer surface of the housing 106 and screw into screw holes provided in the vehicle at a mounting position. In one embodiment, the fasteners 114, 116 may be hex head screws. In alternative embodiments, the fasteners can be screws, Velcro, adhesive, or essentially any other type of fastener. In other embodiments, the DPS may not include any fasteners at all. For example, instead of fastening the DPS in place, a mounting cradle may be mounted or otherwise provided within the vehicle that can capture and hole the DPS in a fixed position relative to the vehicle.

The DPS 100 can be mounted in a variety of different locations throughout the vehicle. For example, the DPS can be mounted to (e.g. by fasteners such as screws, Velcro, adhesive, or any other suitable fastener) the vehicle dashboard, vehicle console, or other vehicle interface. The DPS may instead be mounted to an attachment device that itself mounts to or is integrated with the vehicle dashboard, vehicle console, or other vehicle interface. Essentially, the DPS 100 may be mounted to or integrated into the vehicle in any suitable fashion and at any suitable location such that a vehicle user can access and interact with the user interface provided by the DPS 100. In some embodiments, the DPS may b
e integrated directly into the vehicle, for example, the DPS housing can be integrated with the vehicle dashboard, vehicle console, vehicle steering wheel, or other vehicle interface.

Figure 5:
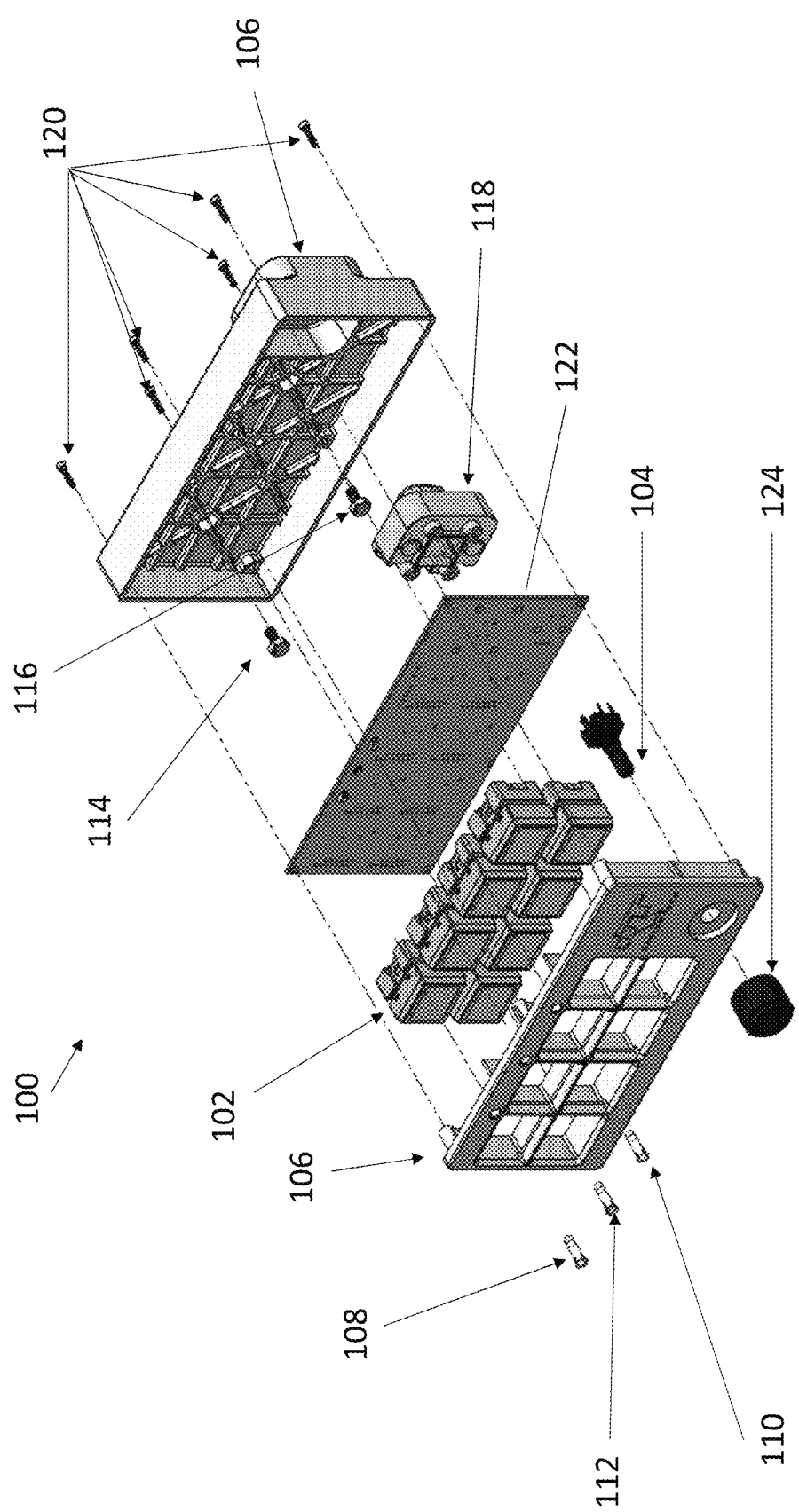
FIG. 5 illustrates an exploded view of the DPS of FIG. 1.

FIG. 5 illustrates an exploded view of the current embodiment of the DPS 100. The two-part housing 106 provides an internal space for disposing, protecting, and fixing DPS components in place such as the printed circuit board 122. The two portions of the housing can couple together to form the housing. In the depicted embodiment, the housing 106 is coupled together through six housing fasteners 120. For example, the housing fasteners 120 may be socket head cap screws. In alternative embodiments, the housing may snap-fit together without the use of screws or take another form entirely. For example, where the DPS is integrated into the vehicle, the housing may constitute a vehicle component, such as a vehicle console or vehicle steering wheel.

The DPS 100 may include a printed circuit board (PCB) 122 for electrically connecting and powering various DPS components. The PCB 122 can be a single board or multiple boards. The PCB 122 can electrically connect some or all of the electronic components of the DPS 100. In some alternative embodiments, the various electronic components can be provided as discrete components and the PCB may be eliminated entirely. In the current embodiment, the plurality of display pushbuttons 102, the rotary encoder 104, the LEDs 108, 110, the sensor 112, and the CAN bus connector 118 are all electrically connected to the PCB 122 to allow for power connections and communication between the various components. The PCB 122 can be laid out in any suitable manner. One consideration for PCB layout may be the size and shape of the housing 106 and the locations of openings in the housing 106. As depicted, the display pushbuttons 102 and the rotary encoder 104 may extend through a front surface of the housing 106. The rotary encoder 104 may be covered by a rotary encoder cover 124. As depicted, the LEDs 108, 110 and the sensor 112 may extend through the front surface of the housing 106, or the LEDs 108, 110 may be otherwise visible through the front surface of the housing 106 and the sensor may otherwise have access to the environment of the DPS through the front surface of the housing 106. As depicted, the CAN bus connector 118 may extend through a back surface of the housing 106 or may otherwise be accessible through the back surface of the housing 106. As noted previously, in other embodiments, the CAN bus connector 118 may be eliminated and the CAN connection from the DPS may be directly wired such that a set of CAN wires are provided that extend out of the housing for connection to a CAN bus. As depicted, the mounting fasteners 114, 116 are screws that extend through the back interior surface of the housing 106 and screw into mounting holes at the mounting location. Where the fasteners take a different form (or in other screw embodiments), the mounting fasteners 114, 116 may be located elsewhere in the DPS, such as a different surface of the housing 106.

By integrating multiple display pushbuttons 102 into the user interface of the DPS, different user interface functionalities can be implemented that can be used for a variety of different various applications while maintaining a relatively small form factor with a compact touch and feel. The DPS can be customized in different forms and shapes, using multiple display pushbuttons. FIGS. 1-5 illustrates one embodiment of a DPS 100 that includes eight discretely activatable pushbutton displays 102 that are arranged in a 2×4 rectangular grid and extend out of an enclosure type housing. However, alternative embodiments can have a different number of pushbutton displays that can be arranged in a different manner and disposed in a different type of housing. FIGS. 11A-C illustrate several different exemplary embodiments that show a some different configurations of a DPS 1100. As shown in FIG. 11A, the DPS 1100 may include five or some other number of display pushbuttons 102 arranged in a single horizontal row on a non-enclosed, plate-type housing. This configuration can be utilized for example as a console face integrated into a vehicle console or other vehicle surface. Such a configuration can be utilized in concert with an enclosure type-housing or a mounting system. FIG. 11B shows another exemplary DPS 1102, this one is somewhat similar to DPS 100 with display pushbutton 102 extending out of an enclosure-type housing structure, but this housing houses six display pushbuttons and has a smaller form factor. In other alternative embodiments, the buttons can be arranged in other configurations, while matrix configurations having at least one row and one column can provide a an aesthetically pleasing and functional UI, other configurations can also provide clean aesthetics and functional UI, some of which may have particular application specific uses. For example, FIG. 11C illustrates a DPS 1104 integrated into a vehicle steering wheel crossbar or other vehicle surface or vehicle accessory. In such embodiments, the housing 106 or a portion thereof can be formed by the vehicle steering wheel crossbar itself. The display pushbuttons can be arranged intelligently and ergonomically on the steering wheel crossbar for efficient and easy actuation and viewing. Although a simple representative plan view of a steering wheel crossbar is illustrated, it should be understood that the steering wheel crossbar may not necessarily be a flat surface and that the display pushbuttons may be mounted onto a curved surface to provide a suitable user interface. Further, although the display pushbuttons 102 referenced throughout these examples and disclosure are generally the same type, size, and form factor, in alternative embodiments different types, sizes, and form factors of display pushbuttons can be utilized, even within the same DPS unit. For example, the screens of the display pushbuttons can be selected such that the curvature of the screens match the curvature of the surface to which the pushbutton is installed. Further, the indicator lights or sensors may be eliminated from the DPS or positioned at a suitable location in order to provide desired application specific functionality. It should also be understood that not all of the display pushbuttons need be identical, in some embodiments, the form factor, type of switch, type of display, reaction speed or other characteristics of the display pushbuttons may vary not only for all of the switches, but for individual or groups of switches. That is, some of the display pushbuttons may be selected to be a particular type and other display pushbuttons in the same DPS may be selected to be a different type. The selections can be based on providing application specific functionality, aesthetics, or for some other reason. By way of example, in some embodiments, some or all of the display pushbuttons 102 may utilize momentary or a latching physical switching configurations. The pushbuttons can be configured as single pole or double pole, and can utilize a normally closed or normally open circuit configuration. One type of display pushbutton 102 in accordance with the present disclosure is a graphic display mounted in a key cap of a momentary pushbutton switch with added facility of RGB colors with discrete control. Such display pushbutton switches as well as many other variations are generally off the shelf available components. For example, switches capable of integration into some embodiments of the present disclosure are available from distributors of NKK Switches, located in Scottsdale, AZ.

Providing multiple addressable display pushbuttons in a compact form makes the DPS a powerful tool. The user interface provided by the collection of display pushbuttons can be extended by providing virtual pages that map different grouping of the display pushbuttons to particular pushbutton characteristics. Based on the number of buttons (n) and the page number (m), the user interface can be extended to address (n*m) display pushbuttons.

The current button being pressed can be ascertained by a controller by the following formula:

Current Button Pressed=Button Index+(Page No.*No. of buttons for the page)

Figure 15:
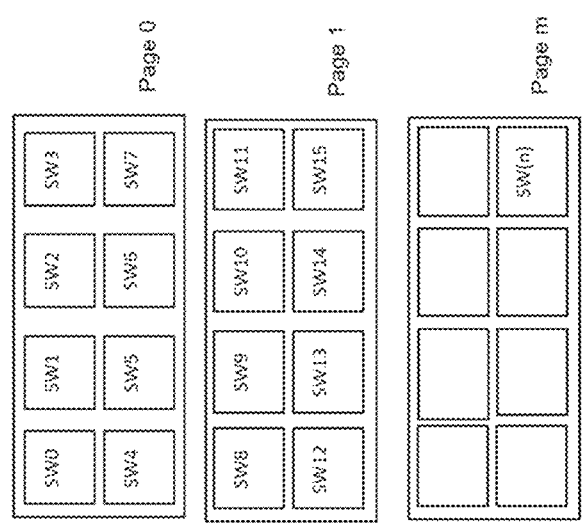
FIG. 15 illustrates a representative DPS user interface implemented with paged virtual switch addressing according to one embodiment.

A detailed example will now be explained with reference to FIG. 15. The DPS 100 includes eight physical switches labeled SW0-SW7 that provide the initial user interface, which can be referred to as page 0. Additional pages of the user interface can be provided by extending the indexing of the switches, e.g. page 1 includes SW8-SW15. Accordingly, the switch on any given page can be generally referenced by SW(n). Using the formula above a button press can be identified as coming from a switch by the following calculation n+(m*K), where n=button index, m=Page No., K=No. of buttons indexed per page.

Because the local controller tracks the current virtual page and executes the instructions to change the current page, the local controller can identify, a particular switch has been pressed by calculation utilizing the switch number (e.g. SW6) and the current page number (e.g. page 2). The controller can determine the index of the switch, and thus where the image stored in memory (and other information) for that switch with the formulate above. Substituting provides SW14 as the current button being pressed (6+(1*8))

One or more DPS units 100 can be installed within a display pushbuttons system network (DPSN). One exemplary embodiment of a DPSN 1 in accordance with some embodiments of the present disclosure is illustrated in the representative block diagram of FIG. 17. The depicted DPSN 1 is implemented as a vehicle CAN bus 2 with various CAN nodes, also referred to as electronic control units(ECUs), interconnected by a vehicle CAN bus 2. The DPSN 1 includes one or more DPS units 100 that operate as CAN nodes that can communicate with other nodes over the vehicle CAN bus 2. The vehicle controller area network (CAN) bus essentially enables communication between ECUs on the bus without any dedicated complex wiring. In this way, information sensed by one node, commands, and requests can be shared with other nodes.

Some of the CAN nodes are vehicle function CAN nodes 600, such as the engine control unit, brake module, automatic transmission, audio system, window control system, and vehicle locks to name a few examples. A vehicle can have many vehicle function CAN nodes 600, and each model may be different in the number and functionality provided by the various nodes. For example, an engine control unit vehicle function CAN node 600 in one vehicle may not be the same in another vehicle. Such a node might provide information about vehicle speed, vehicle acceleration, and other engine control information.

Some CAN nodes may be configured to communicate information periodically or in response to a request/command. Specifically, an ECU can prepare and broadcast information (e.g. sensor data) via the CAN bus. The broadcasted data can be received by other ECUs on the CAN network—and each ECU can make its own determination about what to do with the information. For example, the ECU might look at the CAN message header to decide whether to decode the message or ignore the message.

CAN communication typically utilizes a standard CAN format. That is, communication is packaged into CAN messages, sometimes referred to as CAN frames. A standard CAN frame (CAN 2.0A) has an 11 bit identifier, while an extended CAN frame (CAN 2.0B) is identical except that it has a longer 29 bit extended identifier. A CAN frame can have between 0 to 8 bytes of data (i.e. 0 to 64 bits). There are six other CAN bus protocol message fields, start of frame (SOF), remote transmission request (RTR) control, cyclic redundancy check (CRC), acknowledgement (ACK), and end of frame (EOF). Although the present disclosure is generally focused on a DPS that includes a CAN connection for communication over a CAN bus, other embodiments may emphasize communication utilizing other communication protocols or other types of networks.

Embodiments of the present disclosure can be configured for operation within a variety of different CAN bus networks that utilize different variations on and extensions of the CAN bus protocol. Some extended services and functionalities are provided by the CAN in Automation (CiA) 301 standard, CANopen. CANopen is a CAN-based higher layer protocol. The CANopen protocol stack includes functions relating to process data objects (PDOs), service data objects (SDOs), error control, and network management. For example, the CANopen protocol can enable CAN flexible data rate (CAN FD), which enables higher data rates (upwards of 8 Mbit/second), data payloads of up to 64 bytes, and authentication features.

CANopen introduces an object dictionary into the CAN protocol that is recognized in many vehicle CAN bus implementations. The object dictionary is unique for any CANopen device and represents the access to its implemented application in terms of data as well as configuration. The object dictionary for a CANopen device, such as certain embodiments of the DPS 100, can be provided in software stored in memory, which can be implemented on the DPS 100 local controller (or on a vehicle CAN-side DPS Control CAN node in certain modes/configurations).

An object dictionary describes the functionality of a device by way of communication objects that act as the interface between the communication interface of the DPS and the application program. That is, in CANopen embodiments of the DPS, its communication objects, such as pushbutton display graphic updates and status requests, are described in its object dictionary in a standardized way. CANopen further defines the 11-bit CAN ID such that upper four bits are a function code of the subsequent 8 byte message in the payload (i.e. the data field), and the lower 7 bits are the Node-ID of the transmitting device. When utilizing CANopen, the CAN ID is referred to as a CAN Object ID (COB-ID) because the resulting COB-ID is a combination of a four bit code representing the type of object (e.g. PDO(TX), PDO(RX), SDO(TX), SDO(RX)) and the transmitting node-ID. Essentially, a COB-ID is a special type of CAN frame ID that reserves some bits for a function code associated with the function of the message (or group of messages differentiated by a sub-index in the payload) and the remaining bits for the transmitting node ID. That is, a COB-ID is essentially a <Function Code>+<Node ID>. The COB-ID is therefore not fixed, but rather changes depending on which node is transmitting the message and the particular message or message group. The CANopen protocol reserves some function codes for certain functions (e.g. NMT, SYNC, EMCY, TIME, and HEARTBEAT). Other function codes are reserved for process data objects (PDO) and service data objects (SDO) messages. Typically, the function codes for PDO and SDO messages are assigned in pairs for transmitting and receiving (e.g. PDO1TX=0b0011, PDO1RX=0b0100, PDO2TX=0101, and PDO2RX=0110). The node ID can be essentially any seven bit value (0b0000000-0b1111111). The node ID can be selected arbitrarily or based on some criteria, or be assigned by a third party device/network. If other node-IDs of devices installed on the CAN (or expected to be installed on the CAN) are known those values can be excluded from potential node-ID candidates during the selection process. The node-ID can be selected (arbitrarily or according to some criteria) from a subset of values reserved for the DPS(s), reserved for third party devices generally, or reserved for a particular grouping of devices. In some embodiments, the node-ID and function code values have default values that can be changed. By way of example, a node ID can be changed to comply with CAN ID rules (i.e. avoid conflict with other nodes with the same ID on the CAN). In some circumstanced the node ID conflict can be resolved before both devices are installed on the CAN. In other circumstances, one or both nodes can change their node ID in response to detecting a conflict.

A DPS service data object (SDO) can be used to read entries from, or write entries to, the DPS object dictionary. The SDO transport protocol uses the first byte of the first segment for flow control information. The next three bytes of the first segment contain an index and sub-index of the Object Dictionary entry to be read or written. The last four bytes of the first segment are available for data particular to the device, in this case the DPS. The second and any following segments (using the same COB-ID) contain the control byte and up to seven bytes of user data.

A process data object (PDO) is mapped to a CAN frame using up to 8 bytes of the data field to transmit application objects. Each PDO has a unique identifier and is transmitted by only one node, but it can be received by more than one node. PDO transmissions may be driven by an internal event or remote request. An internal event (e.g. threshold DPS sensor value or elapsed timer value) that triggers message transmission can be specified in the device profile. A default mapping of application objects can be described in the Object Dictionary for each PDO. While the CANopen open extension provides a framework for efficient and robust operation of the DPS, it is not required by, and embodiments of the present disclosure may be implemented without CANopen features.

Referring to FIG. 17, because CAN node communication utilizes a bus, every node on the bus essentially receives any CAN frame transmitted on the bus. However, every CAN node does not necessarily decode the CAN data into physical values from every CAN frame. The decision of whether to decode CAN data of any given CAN frame can depend on a variety of factors. For example, a CAN node may be configured to only decode CAN data from particular CAN frames based on the CAN ID (e.g. COB-ID) or based on other CAN frame header information. A CAN node may only be capable of decoding certain types of frames, e.g. because the CAN node controller has access to an object dictionary entry for that COB-ID that maps the CAN data bits to physical values. In essence, the DPS 100 can be configured to follow the rules described by the CAN protocol for CAN bus communication.

The DPS 100 can be configured in an active mode or a passive mode. In some embodiments, the DPS 100 can be selectively configurable between an active mode and a passive mode. In passive mode, the decoding logic and decoding information (e.g. CAN DBC file) for decoding the messages sent over the network, as well as the control logic (e.g. event trigger criteria for changing the colors, images, and functionality of the display pushbuttons) of the DPS is not resident on the DPS. Instead, the decoding logic, decoding information, and control logic are stored in memory on an external controller, e.g. a CAN-side DPS Control CAN Node 400 as shown in FIG. 17. In passive mode, the DPS simply complies with instructions received. In active mode, the decoding logic, decoding information, and control logic are stored in memory on the DPS.

Put another way, a DPS in passive mode is controlled by instructions received over a CAN bus from an external CAN node. In contrast, a DPS in active mode is controlled by its local configuration. That is, in passive mode, a DPS takes a passive role in controlling the functionality of the DPS, largely reacting to requests for information and commands to update the DPS. While in active mode, a DPS takes a more active role in controlling the functionality of the DPS, the local controller is responsible for collecting information to make decisions about when and how to update the DPS. Both modes have advantages. Active mode is generally faster than passive mode because there is no need to wait for instructions from an external node. The DPS can rapidly make changes (e.g. updates to display pushbutton color, image, text, or otherwise) according to conditions associated with a configuration stored in memory (e.g. based on event trigger criteria being met). A passive mode DPS configuration is generally more portable between different CAN networks while active mode is generally more rigid. For example, two different automobile manufacturers typically will have fairly different CAN database files, which means for an active mode DPS, two different configurations, one for each CAN DBC file will be needed. Whereas, for a passive mode DPS, because the automobile manufacturer provides the CAN-side DPS control node, it will have access to the CAN DBC file and the DPS can be left generic. That is, the same passive DPS can work interchangeably regardless of whether it is installed in the first automatable or the second automobile with different CAN DBC files. That is, in passive mode, the automobile manufacturers provide a CAN-side controller that can send messages to command and request information from the DPS (e.g. the CAN-side controller is configured with criteria and CAN data to command the DPS to change color, change image, and so on). This issue of having to specifically configure an active mode DPS for a particular CAN network can be exacerbated where there are more than two automobile manufacturers, and further still by the fact that even within a particular automobile manufacturer and within particular automobile models, there may be several distinct and different CAN DBC files (e.g. based on different package options or other minor variations).

It is worth noting that ultimately in passive mode or active mode, the DPS can provide a user configurable vehicle UI with unparalleled versatility and robustness. A DPS can be configured to provide precisely the information the driver wants at precisely the right time and in a visually significant and visually customizable manner. The DPS can provide a UI that is robust, sleek, and low-weight for racing situations. It can also be configured for practical everyday applications to make the UI personalized and practical.

Active mode will now be discussed in more detail. In active mode, the DPS can be operated without any influence of any external commands or external controller. The intelligence for the system is located on the DPS itself. It can be programmed in such a way that the decision can be taken based on the value of a signal on the CAN network or the response we get for the particular commands sent. It is possible to read all the CAN bus commands by setting the appropriate parameters in the calibration within the DPS.

When a DPS is used as an active node in a CAN the correct CAN database file (CAN dbc) can be provided in its memory or taken into consideration in its configuration such that the DPS can interpret signals received on the network correctly. For example, in some embodiments, the CAN dbc can be accessed from Vector Candb++.

When in active mode, a controller disposed within the DPS itself, i.e. a local controller, an make decisions based on the status of one or more sensors internal to the DPS, i.e. sensors disposed on or in the DPS itself. For example, one such sensor present in some embodiments is an ambient light sensor that can report a sensor output indicative of ambient light level outside the DPS unit. In operation, the local controller can be configured to continuously check (e.g. in real-time, near real-time, or periodically) the status of the output value of the ambient light sensor and make decisions based on that value. For example, the DPS may enter a low light mode after a threshold ambient light level is reached, changing the brightness and/or colors of the display pushbuttons. The low light mode may be entered gradually over time as the ambient light level changes, with the brightness and/or colors shifting proportionally or according to some other relationship with the ambient light level. Further, the decisions that the controller makes may be based on multiple factors. For example, the low light mode may consider not only ambient light level, but also the current configuration of the display pushbuttons or external data, such as CAN data available from other nodes on the CAN data bus.

The DPS can be initialized, started, monitored, reset, or stopped using network management (NMT) services of CANopen protocol (Refer CiA_301) or another suitable set of services provided by another protocol. For example, utilizing NMT services of the CANopen protocol, the DPS can receive an appropriate CAN command that calibrates the functionality of the DPS to achieve desired functionality. This calibration can include a variety of different configurations. For example, the calibration can configure the device in passive mode for a particular vehicle CAN dictionary, configure the DPS in active mode, populate an initial brightness, color, graphics level for the display pushbuttons and LEDs, configure the on-DPS sensor to provide particular functionality and calibrate such functionality, e.g. gesture detection, ambient light level detection, or proximity detection. The calibration can also include providing CAN dictionary objects from the DPS to one or more nodes on the CAN bus to inform and vice versa where the DPS is informed about CAN dictionary objects of other nodes available on the CAN bus. Further, the configuration can include communication over WiFi to populate available configuration options for user configuration of the DPS. For example, certain graphic images associated with nodes on the CAN bus may be provided to the DPS for use in the display pushbuttons. Profiles that include sets of pre-populated images and other DPS settings can be made available in an associated mobile device application that can be utilized in concert with the DPS unit. These are just some of the exemplary configurations that can be provided.

In passive mode, the DPS can be operated by sending commands to it from an external control unit. For example, operational decisions on the DPS may be based on commands received from a display unit, power management unit, or from any external source.

In this configuration, the DPS acts as a passive device and another device or set of devices act as a master node out in the network which can start and control the DPS. This configuration can significantly ease the burdens associated with porting the DPS to different applications. In passive mode, there is essentially no reason to adapt or modify code on the DPS because its configuration includes programming that enables remote devices to command its operation.

Using the ambient light sensor as an example, in passive mode, the sensor values are not read by default. Instead, another node transmits a particular command to the DPS to activate the sensor and then the DPS takes action to read the sensor values. The command can include sufficient information for the DPS unit to carry out the particular action. In some cases, the action may be preprogrammed in memory such that providing a command identifier is sufficient, in other instances, the command may include more particular instructions for the DPS to carry out to achieve the desired functionality. The command may also include conditional actions for the local DPS controller to carry out depending on the sensor value obtained, or perhaps depending on the sensor value and a combination of other information referenced in the command or other sensor values commanded to be sensed. For example, the display pushbuttons brightness or color may be commanded to be updated to reflect the ambient light level in response to the sensor values read.

Passive mode can be divided into separate sub-modes. For example, in one embodiment, the passive mode includes a fast mode and an extended mode. Each can provide certain benefits. In essence, these sub-modes allow the DPS in passive mode to utilize different sets of messages in order to achieve either high speed of communication (Fast Mode) or high detail of information (Extended Mode).

Examples of both the sub-modes are provided below for each operation. Both the modes can be used separately as well as in a custom combination according to the application.

Examples of process data object (PDO) messages are provided for both sub-modes below. PDO messages can be utilized to transmit various information relating to the DPS according to the CANOpen Standard protocol (Refer CiA_301), which is discussed in more detail below.

In addition, examples of service data object (SDO) messages are also provided below. These SDO messages can generally be utilized after the "Introduction of Operations". SDO messages can be utilized to provide feedback from the DPS to other nodes on the CAN bus, typically about the current status of one or more components of the DPS.

Figure 12:
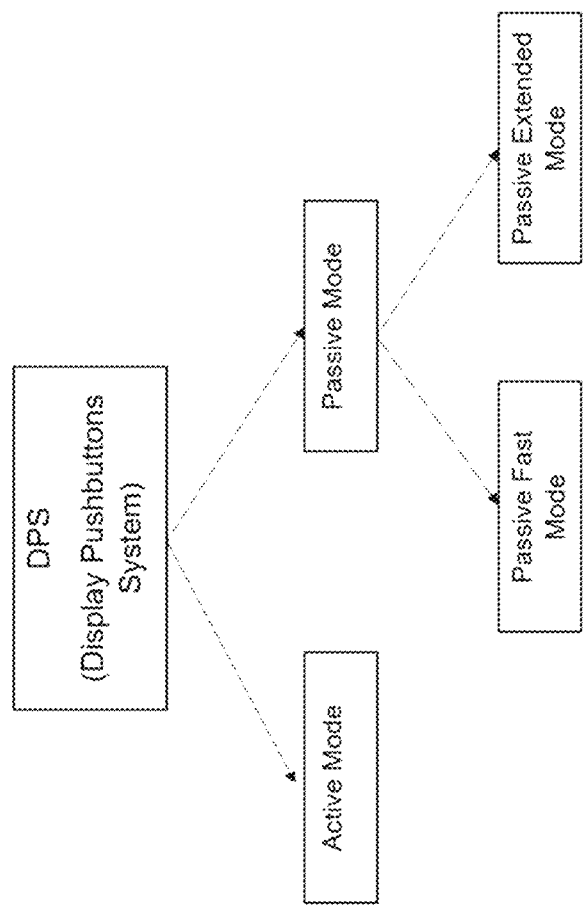
FIG. 12 illustrates a diagram of select DPS modes of operation.

The modes and sub-modes of one embodiment of a DPS are illustrated in the representative tree block diagram of FIG. 12. In alternative embodiments, a DPS may include additional, fewer, or different modes and sub-modes of operation.

Some additional details about the differences between active and passive mode embodiments within a system utilizing CANopen will now be discussed in detail. In passive mode, the DPS 100 can provide several PDO and SDO entries in a DPS object dictionary so that other CAN nodes on a CAN network 2 can communicate with and control the DPS 100. In the passive mode, much of the DPS control strategy is located in one or more CAN-side DPS control CAN nodes 400. One advantage of passive mode, is that the DPS 100 does not need to be programmed to understand the particular CAN messages of a particular CAN network, e.g. in passive mode, the DPS 100 does not need to have access to the object dictionary defining how to decode the various specific CAN messages transmitted on that particular CAN network. In passive mode, the DPS 100 is essentially interoperable with any vehicles that implement CAN-side DPS control within a CAN node 400 utilizing the provided DPS object dictionary. In contrast, in active mode, the DPS 100 has access to some or all of the CAN messages communicated on the network, e.g. the object dictionaries of the various devices present on the CAN network. This allows the DPS 100 local control system to implement advanced and custom tailored control strategies that involve not only local DPS triggered events, but also customizable CAN-based triggered events. To be clear, the DPS 100 in passive mode can still be configured to react to CAN information, however, such control is routed through a CAN-side DPS control node 400 that is connected to the network 1 and programmed with CAN object dictionary for both the DPS 100 and other CAN nodes.

Figure 6:
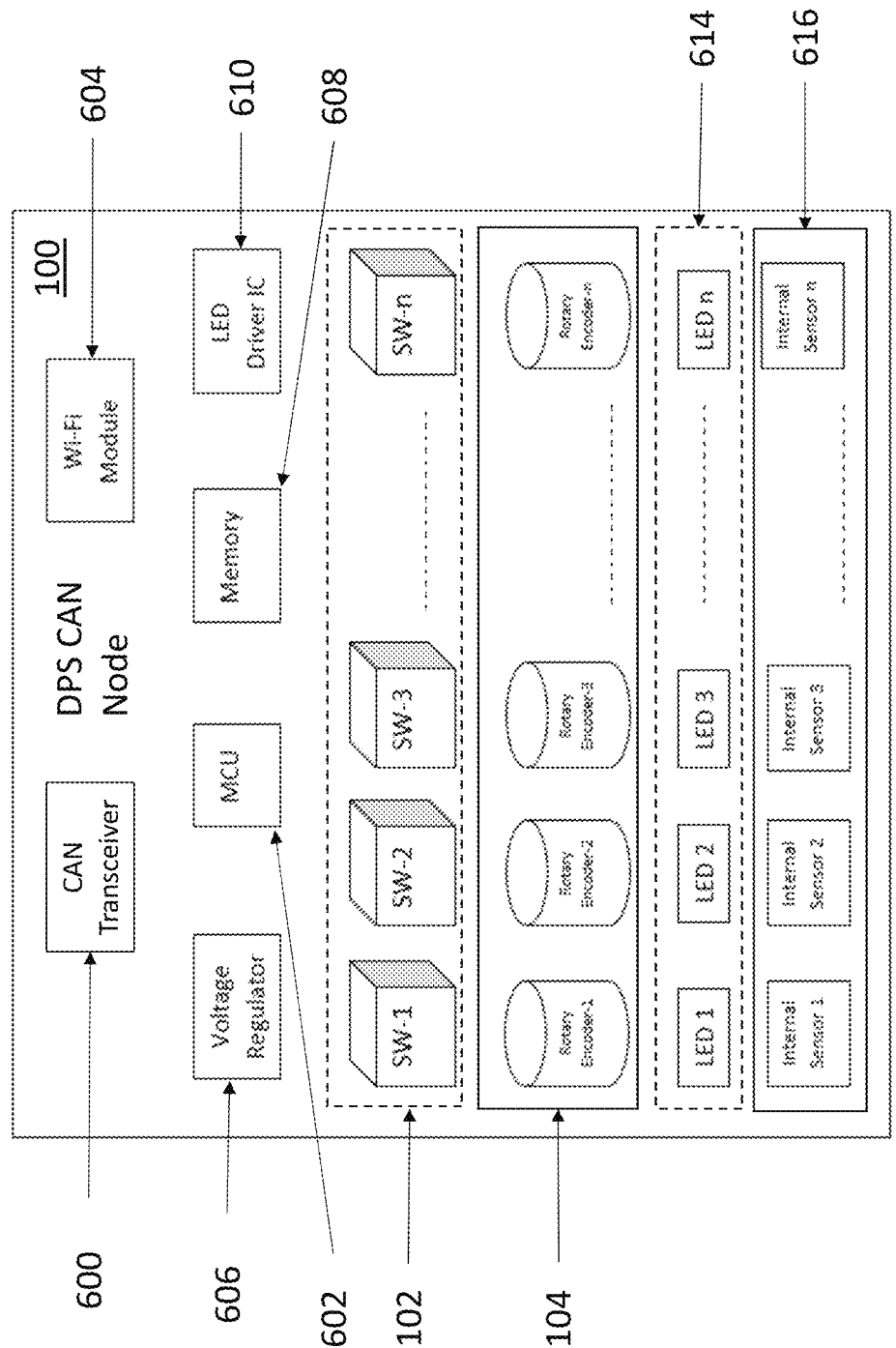
FIG. 6 illustrates a representative block diagram of DPS functional components according to one embodiment.

FIG. 6 depicts a representative block diagram illustrating an exemplary set of electronics of the DPS 100 according to one embodiment. This is an exemplary architecture of the DPS 100, but many other architectures are suitable and within the scope of the disclosure. As depicted, the DPS 100 may have a plurality of display pushbuttons 102, one or more rotary encoders 104, one or more LEDs 614 (e.g. for providing status indications about the DPS), and one or more sensors 616. The DPS 100 can include a controller or processor, which can also be referred to as a microcontroller unit (MCU) 602. The MCU 602 may also be referred to as a local DPS controller or simply local controller. This nomenclature is used in contrast to a CAN-side controller 400 (i.e. external controller) located outside the DPS, but coupled to the same CAN bus in passive mode embodiments. The MCU 602 may be in electrical communication with the various components of the DPS 100. For example, the MCU 602 may be coupled to and configured to control one or more of the pushbuttons 102, the rotary encoders 104, the LEDs 614, the sensors 616, the CAN transceiver 600, the Wi-Fi module 604, the voltage regulator 606, memory 608, and the LED driver IC 610, or any combination thereof. In some embodiments, the voltage regular 606 regulates input power and supplies powers to the various DPS components. The MCU 602 may be connected to a battery and act as a power management unit controlling aspects of the voltage regulation provided by the voltage regulator, or alternatively, the voltage regulator 606 may be self-contained and provide power to the MCU and other components without the MCU or other components exerting control over the voltage regulator 606. In some embodiments, the MCU 602 may include one or more of the voltage regulator 606, the memory 608, the LED driver IC 610, or any other DPS components that provide control functionality, or any combination thereof.

The memory 608 may store the graphics programmed to appear on the pushbuttons 102. The memory 608 may include one or more discrete memory units that can each be the same or different type of memory. For example at least some of memory 608 can include flash memory configured for storing images suitable for quick access and upload to the display pushbuttons 102. The memory 608 can store other information as well. For example, certain control logic for the CAN transceiver, MCU, WiFi module, or LED driver IC can be stored in the memory. Further, certain pieces of information can be stored in memory that are utilized by the control logic, such as event trigger criteria. For example, various conditions and thresholds associated with triggering an update of the graphics on the display pushbuttons or status indicator LEDs 614 can be stored in the memory 808. Further, various sets of instructions associated with certain events can be stored in memory that the MCU or other DPS components are capable of accessing and carrying out in response to event trigger criteria. For example, in response to certain graphics event trigger criteria, the local controller 602 can be configured to update the graphics of the display pushbutton switches with particular images stored in memory.

Embodiments of the present disclosure include a controller that can access and transfer image data from memory to displays included within the DPS, such as the display pushbuttons. Different images can be used to fulfill specific applications based on internal or external actions through wired/wireless communication, e.g. based on graphics event trigger criteria.

Images can be stored in memory according to a particular format that can be pre-defined. For example, different sets of images can be grouped according to different applications associated in memory. Flash memory addresses for the stored images can be defined and specific offsets can be defined that facilitate accessing particular images. A user can configure a controller to update graphics of the display pushbuttons according to associations between images stored in memory and specific display pushbuttons. As such, a user can store various graphics in various pre-defined memory locations offset by a pre-defined amount of memory sufficiently large for the largest image, or utilizing another memory management and indexing technique. The different pre-defined memory slots can be referenced by offsetting from a starting memory location in a contiguous graphics memory section by an offset value calculated by multiplying an image index value by the pre-defined memory slot size. Thus any graphics (e.g. icons or other images) stored in memory can be displayed on any display pushbutton. Further, in some configurations, different sets of grouped images can be stored at specific offsets for a particular application (e.g. consecutive memory chunks sized for a set of images) and referenced as a group instead of individually.

The images can be stored as an array in memory. For example, the images may be stored as a two-dimensional array that can be indexed by two subscripts. One subscript can represent a virtual page number and the other subscript can represent an image associated with a particular physical display pushbutton. The virtual page number allows multiple images to be associated with the same physical display pushbutton. For example, where an exemplary DPS with eight display pushbuttons and three virtual pages can have images stored in an array accessed by a command similar to: ImageArray[0-2] [0-7]. In the current embodiment, at any given time, the actual displays of the display pushbuttons can be configured with images of one page of the array, i.e. ImageArray[0][0-7], ImageArray[1][0-7], or ImageArray[2][0-7]. The eight memory slots represented by 0-7 for each different page number represent offsets for locations in memory where the images associated with that page are located. The offset can be adjusted to account for the page number as well. Accordingly, the two subscripts cooperatively provide a virtual page number for a different set of images for the DPS.

The current embodiment can be configured such that the controller can handle multiple operations simultaneously or in quick succession by selecting a particular page from the defined array of pages and make custom changes per the current status of that particular button and according to user desires.

Features relating to dynamically changing the graphics, either individually or in groups, make the DPS and its configuration efficient, fast, and different from other types of available vehicle interfaces.

Figure 13:
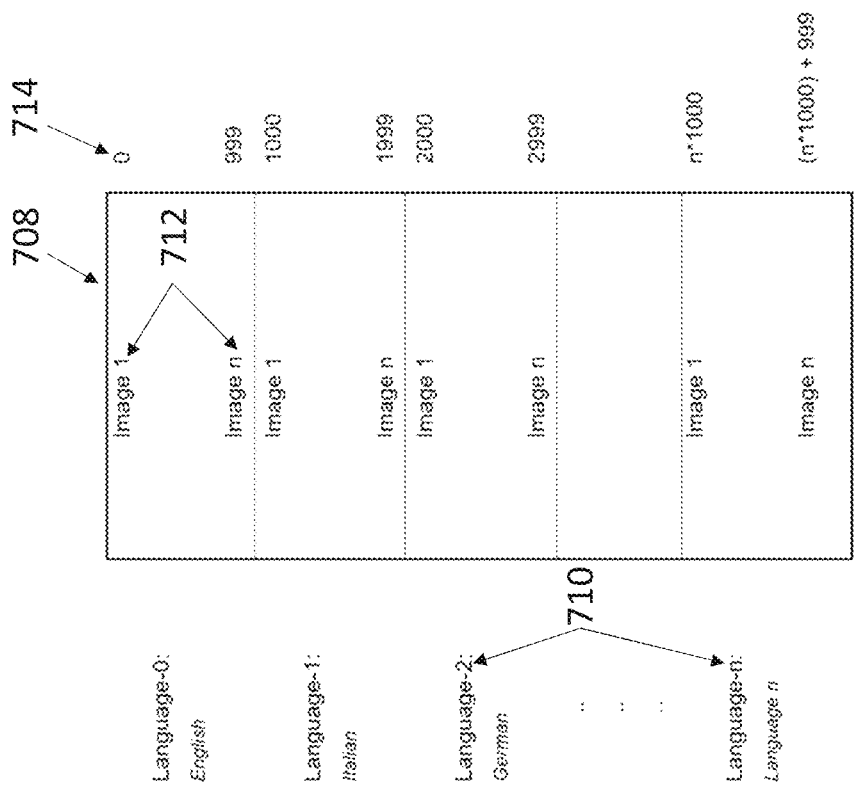
FIG. 13 illustrates a representative view of a memory map according to one embodiment.

An exemplary embodiment of the memory mapping features discussed above will now be described in detail with reference to FIG. 13, which illustrates how different language localization for images having associated text or associated text overlays can be significantly improved with embodiments of the present disclosure. In particular, the depicted memory mapping provides a unique and flexible system and method for selecting any particular images in any desired language.

Memory 708 represents a contiguous space in memory where images are stored. The memory can be accessed by a two-dimensional array. The first subscript 710 references the language and the second subscript 712 references the image index for that language subscript. The actual memory offset 714 for any image can be calculated based on the subscripts. As an example, the process for displaying image number 34 in English, Italian, and German languages on different pages of the DPS (e.g. that can be scrolled through by actuation of the rotary encoder or pressing another button encoded with that functionality) is discussed in detail below.

The controller can be configured to access a particular language using a fixed memory address offset. For example, images associated with each language may be offset by 1000 bits, bytes, or some other unit of measurement relating to memory. Accordingly, where the first subscript is referenced by the variable n, a memory offset formula provides an offset by multiplying the index by the fixed offset, e.g. (n*1000). Accordingly, in this configuration, 0 to n-languages are mapped to the memory. In this way the language can be selected by the language index and, if images are stored properly, then only images of that type will be selected within the range of memory offsets associated with that language. For example:

English (n=0)→(0*1000)→language memory offset 0000
Italian (n=1)→(1*1000) →language memory offset 1000
German (n=2)→(2*1000)→language memory offset 2000

The controller can also be configured to consider image number as an offset within the memory offset. That is, the correct image with respect to the correct language can be selected by adding the image offset to the language memory offset of different languages.

0000+34→34 represents Image No. 34 in English
1000+34→1034 represents Image No. 34 in Italian
2000+34→2034 represents Image No. 34 in German Other graphics information besides image information can also be input to the display pushbuttons. For example, color and brightness input can be provided to change the color and brightness of the display pushbuttons. Further, this information may or may not be saved in memory, for example utilizing the image offset methodology mentioned above.

With regard to color, the present disclosure can provide a unique experience by dynamically changing color among a configurable selection of colors driven by practically infinite different event trigger criteria. The current embodiment is rooted in RGB control logic that can be implemented by a local DPS controller. Several examples of color event trigger criteria include:

Changing one or more of the DPS LEDs (e.g. an LED within or associated with a display pushbutton or a status indicator LED) to a particular shade of red (or another programmed RGB value) in response to a threshold exceeding a predetermined threshold.

Changing one or more of the DPS LEDs to a particular shade of green (represented by an RGB signal value) in response to the associated system working fine and all operational values reflecting a proper level.

Changing one or more of the DPS LEDs to a particular color in response to a threshold or combination of thresholds relating to different vehicle characteristics (e.g. vehicle speed, vehicle acceleration, vehicle cabin temperature etc.)

Changing one or more of the DPS LEDs to a particular color in response to an internal or external action through wired/wireless communication.

Accordingly, a myriad of different conditions can be utilized as color event trigger criteria to provide customized color for essentially any application. Further, the various color event trigger criteria can be as simple or complex as desired.

Brightness events are another example of graphics events that can be triggered based on graphics event trigger criteria. Specifically, some events can be driven specifically by brightness event trigger criteria. Such criteria and resulting brightness events can be handled in a similar fashion as the trigger criteria and resulting events for color and images. That is, the DPS of the present disclosure can change brightness of various components, perhaps most notably the display pushbutton brightness can be individually or collectively controlled. As with color and images, the specific functionality for brightness events can vary from application to application. For example, brightness levels can be altered according based on internal actions or external actions through wired/wireless communication. In some embodiments, an integrated ambient light sensor can provide output that triggers automated backlight adjustment in the DPS. Such can be provided in active or passive mode.

Figure 7:
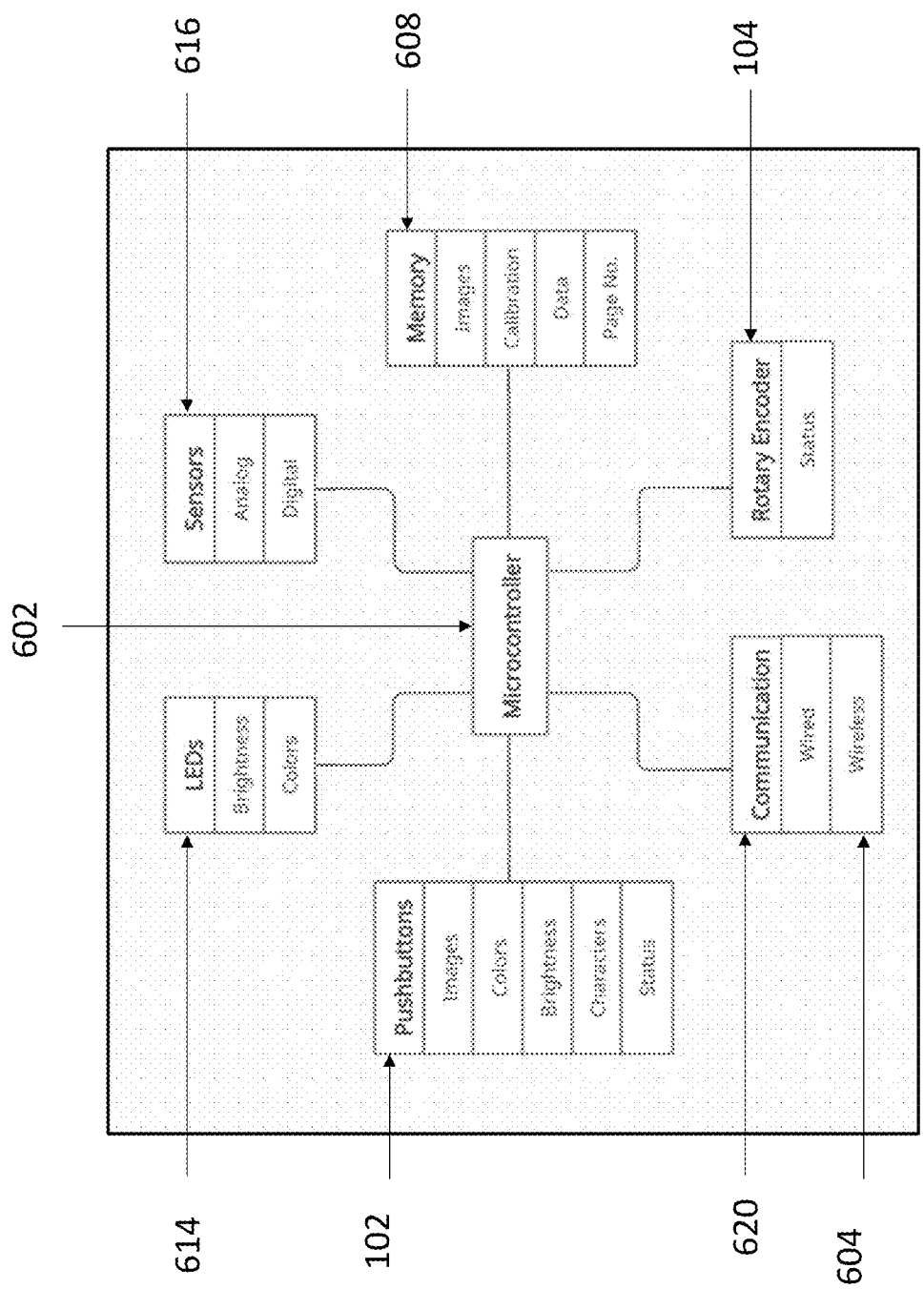
FIG. 7 illustrates a control signal map for a DPS controller according to one embodiment.
Figure 8:
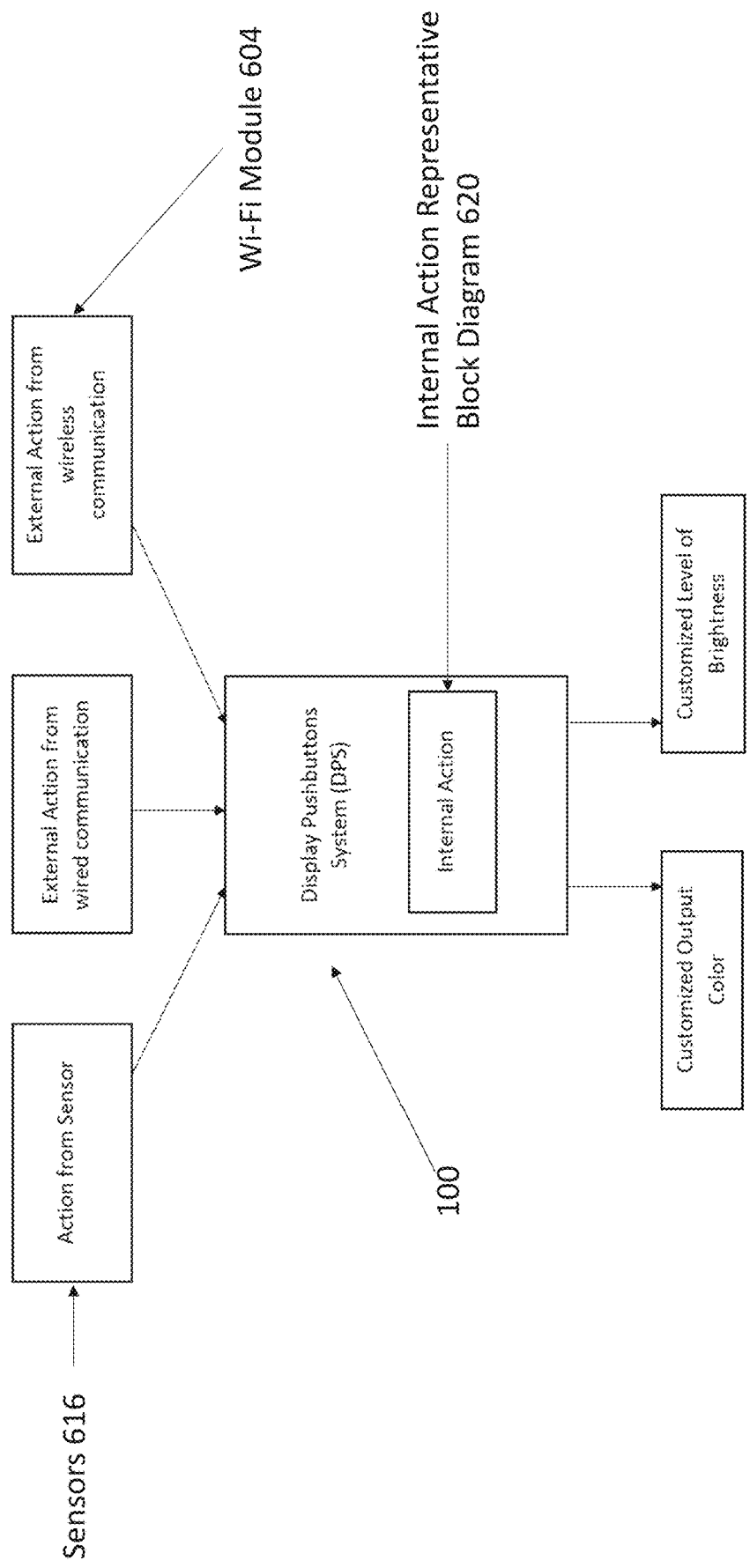
FIG. 8 illustrates a representative block diagram of DPS functionality relating to color and brightness events of the display pushbuttons of the DPS.

Referring to FIG. 8, an exemplary general architecture of a DPS will now be described in detail. The DPS 100 can receive signals from sensors 616 (internal and external to the DPS), wired external actions (e.g. from a CAN node on a vehicle CAN bus), and wireless external actions (e.g. from a mobile device over a WiFi link). The DPS can also include a controller that handles numerous different internal actions 620. A more detailed explanation of examples of DPS internal actions can be found in connection with the description of FIG. 7. Based on the various actions received, the DPS can provide various outputs, e.g. as shown in FIG. 8 a customized output color and customized level of brightness can be provided to the DPS components, such as the display pushbuttons. The customized outputs may not match the commands provided from the various actions because the DPS may include modifying criteria.

Character events are additional examples of command events that can be triggered based on event trigger criteria. Character events can essentially be letters, numbers, or other symbols that can be displayed on a display pushbutton. A character event can drive be the sole input for a display pushbutton, or a character event can be utilized in tandem with other graphics events as a character overlay. For example, when utilized in conjunction with a color event, the character event can provide text overlaid on a solid color. When utilized in conjunction with an image, characters can be overlaid on top of the image displayed on the display pushbutton. In some embodiments, a character event may displays a single character, in other embodiments, a word or phrase may be displayed. For example, a battery symbol is one type of character that might be overlaid on top of a graphic, illustrating perhaps mobile phone battery power, or battery power of another device associated with that particular display pushbutton image. Further, the character event may be based on or represent information available to the DPS, such as vehicle CAN data or DPS sensor data indicative of specific functions, values, labels, or text. For example, the cabin temperature or vehicle speed can be overlaid on top of a graphic while criteria changes the color of the characters and/or the LEDs associated with that display pushbutton. The character event may specify a particular font for the text based on a font library. The text characters can be displayed at a single specified display pushbutton or across multiple display pushbuttons, for example where each display pushbutton represents one or more characters and a word or sentence is displayed across a row or column of display pushbuttons. As another example, the character event may provide a scrolling behavior where characters scroll or move across a display pushbutton or multiple adjacent display pushbuttons. Like other event criteria mentioned previously, the criteria for triggering a character event can be based on essentially any internal or external information available to the DPS. In some embodiments, the text event is based on internal actions or external actions through wired/wireless communication.

Figure 9:
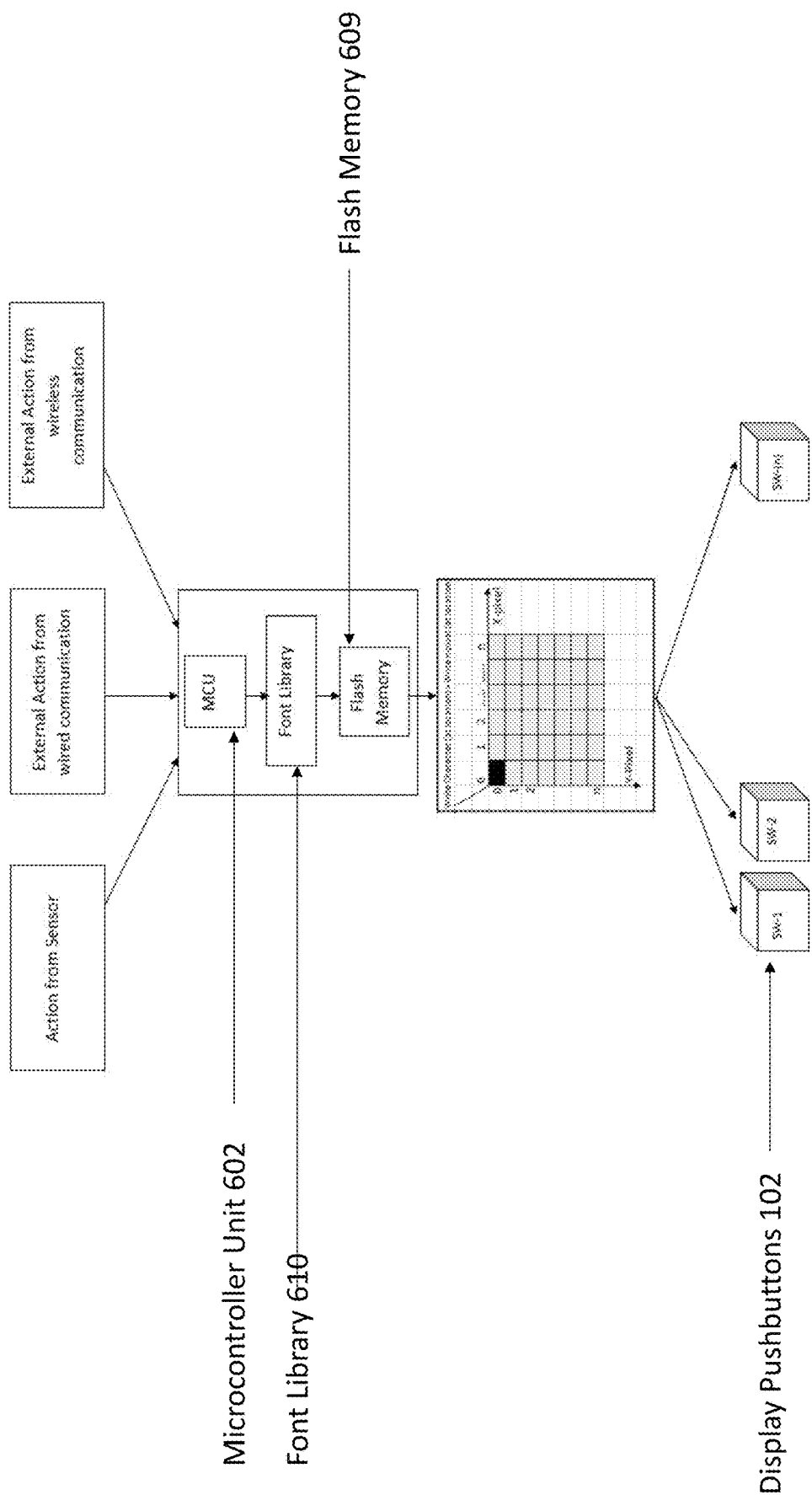
FIG. 9 illustrates a representative block diagram of DPS functionality relating to character events for customized graphic on the display pushbuttons of the DPS.
Figure 14C:
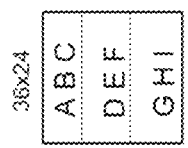
FIGS. 14A-C illustrate exemplary ways that characters can be displayed on a display pushbutton screen according to various embodiments.
Figure 14B:
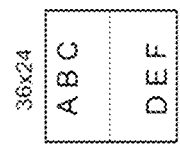
Figure 14A:
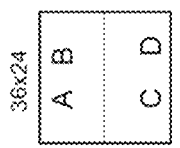

Character events can be implemented using a relevant font library stored in memory, e.g. as depicted in the representative block diagram of FIG. 9. A font library 610, in addition to providing a selection of fonts that can be selected to display different characters, the font library can provide mappings and settings to change how characters are displayed on one or more display pushbuttons. For example, several different character arrangements are illustrated in FIGS. 14A-C. In operation, in response to a character event, the controller can access the font library and cause the display pushbutton to display a particular character by accessing the pixels responsible for that character and passing resulting hex number as per the library. The font size and the number of characters can be customized to be written on the display pushbuttons.

The font library can access the images stored in flash memory 609 and overlay characters onto the images, which can modify the pixels displayed on the pushbuttons 102 as illustrated in FIG. 9. In some embodiments, a font library can identify character by ASCII code to represent specific character on display pushbuttons.

Below are some examples that indicate various possibilities for character events and how character events can be customized. The examples herein are provided within the context of the U8g2_for_Adafruit_GFX-master library, which is one exemplary font library that can be utilized in connection with embodiments of the present disclosure.

FIG. 14A illustrates an exemplary 36 by 24 pixel display for a display pushbutton. In this example a character is 18 by 12 pixels. In this configuration, two characters can be displayed on each of two lines using appropriate pixel height from the previously mentioned exemplary font library. FIG. 14B illustrates another example, in this example a single character is 12 by 12 pixels, which provides sufficient space for three characters to be displayed in each line using an appropriate pixel height from the same font library. FIG. 14C illustrates a configuration with three rows characters. Each character is 12 by 8 pixels and three characters can be provided on each line using appropriate pixel height from the font library.

The graphics event trigger criteria, including image event trigger criteria, color event trigger criteria, and brightness event trigger criteria, can be altered to provide different UI functionality depending on the application. As discussed in more detail below, in some embodiments, a user can remotely configure different event trigger criteria in order to reconfigure the DPS to provide a desired UI experience. That is, the DPS may be configured to dynamically and automatically update its images, colors, and brightness, and other characteristics based on certain event trigger criteria (e.g. stored locally for active mode DPS configurations or remotely in passive mode DPS configurations). However, it is worth noting that the dynamic and automatic functionality itself can be updated in some embodiments by providing an external device interface for changing the graphics event trigger criteria, uploading or selecting custom graphics for local storage on the DPS, or for changing other event trigger criteria associated with the DPS.

The DPS 100 may include an LED driver integrated circuit (IC) 610 for activating and deactivating the LEDs 614. The LEDs 614 may be individually addressable, addressable by group, or LED control signals may be configured to change all of the LEDs. Each LED unit 614 may include at least one red LED, green LED, blue LED, and white LEDs, or any combination thereof. Accordingly, the LED driver IC 610 may selectively change the color, brightness, or other characteristic of one or more LEDs 614. The LED driver IC 610 can be controlled by the MCU 602 or another lighting controller to provide various visual effects such as blinking, gradient, dimming, and other visual effects. The MCU 602 or another lighting controller can operate the LEDs based on sensor input, such as the local sensors 616 or based on CAN data that can include vehicle sensor data, such as vehicle speed, vehicle acceleration, vehicle lock status, vehicle brake status, vehicle window status, or essentially any other vehicle CAN sensor data. The local sensor 616 can provide information regarding ambient light level, gestures, and proximity—the control logic of the controller or other light controller can adjust the LEDs based on the sensor input.

The CAN transceiver 600 can also be referred to as a CAN bus transceiver. The CAN transceiver 600 may be connected to and configured for communication with a vehicle CAN bus, such as the vehicle CAN bus 2 illustrated in FIG. 17. In embodiments where the DPS 100 includes a CAN bus connector 118, the CAN transceiver 600 can be coupled to the CAN bus connector 118, such that when a connector is plugged into the CAN bus connector from a CAN bus, the CAN transceiver can send and receive CAN frames on the CAN bus. The CAN transceiver may act as a CAN controller that decodes CAN frames and forwards CAN data to the MCU 602 for processing. In alternative embodiments, the CAN decoding functionality can be integrated into the MCU 602 in addition to its other functionality.

The controller 602 can be configured to respond to the CAN data by instructing the other components in the DPS accordingly. For example, in passive mode, the CAN data may include specific commands, e.g. load a particular image or set of images from memory and upload the image to a display pushbutton or set of display pushbuttons. Or, as another example, the CAN data may include specific requests for the local controller to collect and send information on the CAN bus, e.g. the CAN-side Control node 400 may have been rebooted and not have a record of the current images displayed on the display pushbuttons, and so the request may request that the local controller obtain the last images sent to the display pushbuttons (e.g. from a memory buffer), identify which images are stored in which display pushbuttons, and transmit a return CAN frame (e.g. by storing CAN data identifying each image at a predetermined location in the CAN data associated with the display pushbutton displaying that image, encoding that CAN data in a CAN frame, and transmitting it on the CAN bus).

The MCU 602 may register a feedback event and/or a graphics event. In response to a feedback event, the MCU 602 can obtain a display pushbutton button status from each of the plurality of display pushbuttons 102 via their output interface. The display pushbutton button status may include an indication of whether each pushbutton has been pushed. In response to a graphics invent, the MCU 602 may select one of the display pushbutton graphics stored in the memory 608 based on the association between the display pushbuttons and the display pushbutton graphics. The MCU 602 may then transmit the selected display pushbutton graphics to each of the display pushbuttons by each of their respective input interfaces.

Referring to FIG. 7, a control signal map illustrating exemplary internal actions and two-way communication of a controller disposed in a DPS is depicted. The controller 602, also referred to as microcontroller unit (MCU 602), can be configured to issue commands or requests to (and receive return communication/signals from) the display pushbuttons 102, the rotary encoders 104, the memory 608, the LEDs 614, the sensors 616, and the external communication module 620. The MCU 602 can send a message to one, all, or a subset of the pushbuttons 102 to change the display pushbutton graphic which may include images and/or characters, the color, and the brightness of the display pushbutton screen. The MCU 602 may also retrieve the current displayed graphic, color, and brightness from one, all, or a subset of the pushbuttons 102. In some embodiments, this can be achieved by requesting the pushbuttons 102 to send the status of the pushbuttons to the MCU 602 over the display pushbutton I/O. In other embodiments, the controller or memory may include a buffer that saves previous commands, which can be referenced to obtain current information about the pushbuttons or other components. The display pushbutton status can include the page number of the DPS and/or whether each of the pushbuttons 102 is pressed. The MCU 602 can request and receive information from the rotary encoder 104 indicating its status. For example, the rotary encoder status may include whether the button element of the rotary encoder is pressed and/or information clockwise/counterclockwise actuation of the rotary encoder. The MCU 602 may access the memory 608 to store or retrieve the display pushbutton graphics for display on the pushbuttons 102, calibration information, page number, and essentially any other suitable data. The MCU 602 can communicate with the LEDs 614 to control their brightness and/or color. For example, the brightness of the LEDs 614 may be controlled by an amount of voltage and the color of the LEDs 614 may be controlled by one or more signals corresponding to an RGB value(s). The sensors 616 may be analog, digital, or a combination thereof—multiple sensors may be included in some embodiments. The MCU 602 may request and/or receive a status of the sensors 616. The MCU 602 can communicate with the external communication module 620 to receive a configuration for the DPS, information from the vehicle CAN bus, or requests for information from the vehicle CAN bus. The external communication module(s) 620 may be wired (for example, a wired CAN bus connection) and/or wireless (for example, the Wi-Fi module 604)—multiple of each can be included in some embodiments.

In one embodiment, the display pushbuttons 102 can display 16-bit RGB custom colors according to the command sent to the display pushbuttons 102 from the MCU 602 based on internal or external events.

The MCU 602 may be configured to selectively display different content on the display pushbuttons 102 in response to different events. The events can be received over a variety of different communication protocols mainly from two sources: internal communications or external communications. Examples of internal communications may include the press or release of another display pushbutton 102, a rotation of the rotary encoder 104, the status of the sensor(s) 112, the combination of a press of release of a display pushbutton 102 and a rotation of the rotary encoder 104, and a specific pattern combining the available features of the DPS (i.e. by pressing two specific display pushbuttons 102 within a certain time threshold of each other). Examples of external communications may include a CAN of a motorsport vehicle, a Wi-Fi network (or other over the air (OTA) communication), a universal serial bus (USB) port, and a joint test action group (JTAG).

In one embodiment, the DPS 100 may have multiple display pushbuttons 102 and each pushbutton 102 can have multiple functionalities. The rotary encoder 104 can be actuated to change the page of the DPS 100. When the page of the DPS 100 is changed, the graphics on each of the display pushbuttons 102 can be changed by the MCU 602 accessing the memory 608 to retrieve the particular graphic. The graphics displayed on each of the display pushbuttons 102 on different pages can be modified based on internal events or external events.

In one embodiment, the MCU 602 can adjust the brightness of each individual display pushbutton 102 independently to different brightness values by modifying the command sent from the MCU 602 to the display pushbutton 102. The brightness level may be adjusted based on an internal event or an external event.

In one embodiment, the MCU 602 can cause American Standard Code for Information Interchange (ASCII) characters to be displayed on any or all of the display pushbuttons 102. A user of the DPS may be able to select a preference for the number of rows and number of ASCII characters displayed on each of the display pushbuttons 102. The ASCII characters and the user preference may be modified based on an internal event or an external event.

In FIG. 12, different ways the DPS can be configured are shown. The DPS may be configured in Active Mode or in Passive Mode. In Passive Mode, the DPS may be configured in Fast Mode or Extended Mode. In some embodiments, the DPS is selectively configurable between active and passive mode.

Embodiments of the present disclosure are generally capable of determining or verifying particular status or feedback information about particular DPS functions or components. This may entail actively checking the status of a particular component, such as obtaining a sensor reading, or referencing a previous command associated or associated buffer in memory. Several examples will now be discussed in detail of the various status information that can be obtained. In active mode some of this information can be actively monitored and utilized to drive and trigger events at the local controller. In passive mode, this information may be collected in response to a request and provided to a remote controller, such as a remote CAN-side DPS control node for processing.

Referring back to FIG. 7, in some embodiments, the local controller 602 can obtain status information about the various DPS components, such as the switches 102, LEDs 614, sensors 616, rotary encoder 104, the communication components 620, and memory 608.

Some information is stored in memory 608, e.g. as tracking information or as the last buffered command to that component. This can be helpful in providing status about some DPS components where their status is not readily ascertainable by querying, monitoring, or communicating with the component. For example, pushbutton status may be provided as a temporary voltage signal. The status of the pushbutton may not be obtainable from the switch itself, but it can be reconstructed by analyzing buffer commands or other memory where status information about the switch status is stored in memory. This information can be utilized to understand whether certain event trigger criteria is met. That is, the status of a single pushbutton or a combination of more than one pushbutton can be obtained about the pushbutton status, but perhaps not directly from the pushbutton itself.

This can be illustrated in a particular manner because in the passive mode, temporary pushbuttons have two states (0 and 1) and different functionalities of the DPS can be implemented (e.g. change colors, images, brightness, add characters) based on the status of the pushbuttons as the button presses happen.

In active mode, software switch latching can allow the system to remember multiple states after a button is pressed, which can provide implementation opportunities for different functionalities of the DPS (e.g. change colors, images, brightness, add characters) based on the different statuses of the pushbuttons and can ease tracking burdens present with some configurations.

As another example, the rotary encoder can be configured such that its status clockwise direction movement, counter-clockwise direction movement, and pressing event can be determined by the local controller. As such, desired actions can be taken based on the three different statuses of a rotary encoder In some embodiments, the DPS can send and receive commands over a wired or wireless bus, serial port, Wi-Fi, Bluetooth, a mesh network, or any combination thereof using one or multiple different communication protocols.

In several embodiments, the DPS can communicate both via a wired communication technology, such as a wired CAN bus, as well as a wireless communication technology, such as a WiFi module. Perhaps this is best shown in the representative functional block diagram of FIG. 6, which includes both a CAN transceiver 600 as well as a Wi-Fi module 604. WiFi modules and CAN transceivers are generally well known and therefore will not be described in detail, suffice it to say, there are a variety of different types of WiFi modules and CAN transceivers, and essentially any of them can be utilized in connection with various embodiments of the present disclosure. Further, the DPS can communicate utilizing a variety of different communication protocols, for example including one or more of CAN, USB, serial TTL, HTTP, MQTT, or any combination thereof to name a few exemplary communication protocols.

The ability for the DPS to receive and send communication over a variety of different types of communication modules as well as utilizing a variety of different communication protocols provides access to various data that can be utilized in various event trigger criteria and contributes to providing a dynamic and configurable user interface. In particular, where both a CAN connection and a WiFi connection are provided, the DPS can act as a compact, robust, and dynamic user interface that can provide user interface elements that are specifically configured for a specific vehicle application, such as racing. The ability to customize and dynamically display different information as well as dynamically providing different functionality is especially effective in an automotive environment where the user's attention is split between the road and the user interface. The ability to reduce the size of the user interface and to only show the user the information they expect to see at the time they expect to see it is especially valuable to automobile racers.

The wide communication options also can supplement the configuration options by providing access to various communication paths for transmitting images or other data such as profiles relating to user preferences. Further, the communication options allow the controller software and other DPS components to be easily upgrade, such as via Wi-Fi (OTA—over the air) connection or through a USB port or JTAG.

Figure 10:
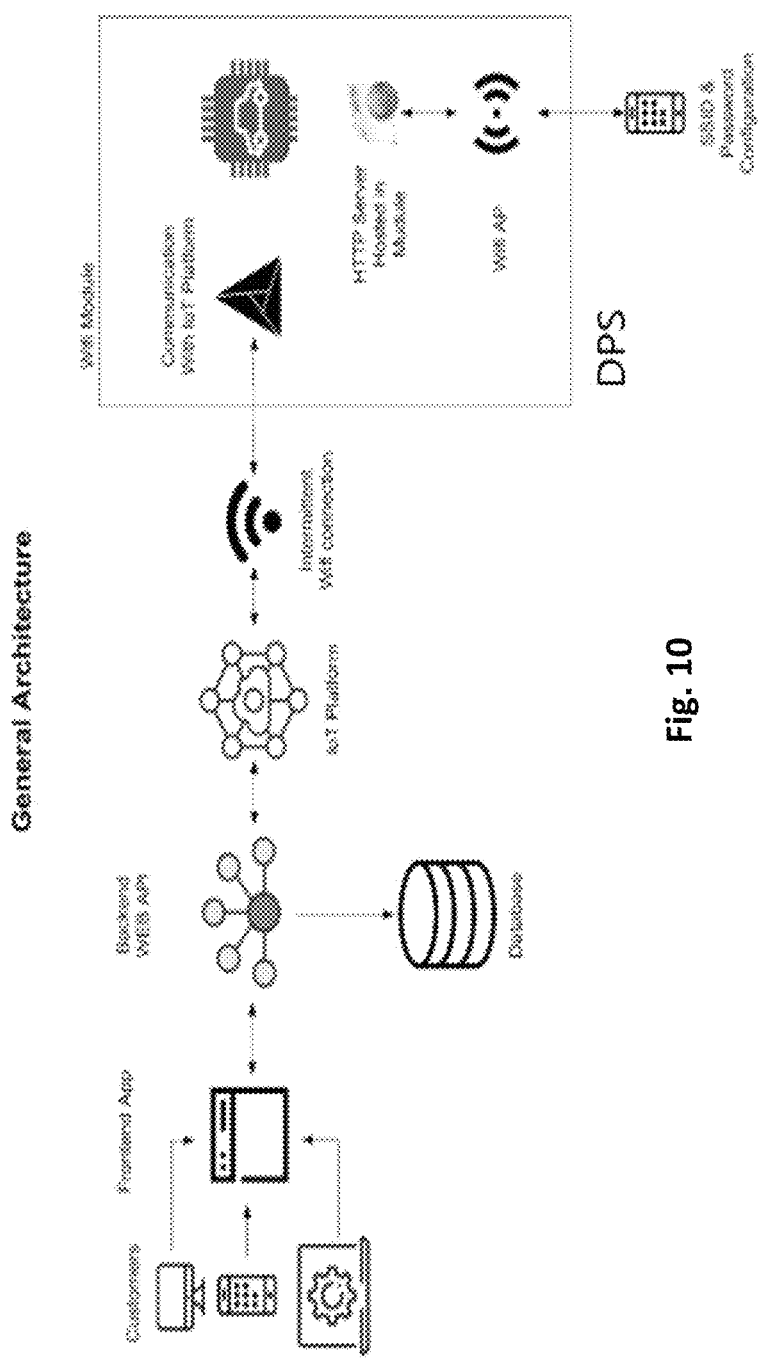
FIG. 10 illustrates a general network architecture diagram including a DPS with a Wi-Fi connection according to one embodiment.

A representative block diagram illustrating a general architecture of the DPS is illustrated in FIG. 10. This general architecture can be utilized to allow a user to configure the DPS, for example to upload new images to the DPS for use with the display pushbuttons. That is, FIG. 10 illustrates how the DPS module can be configured over Bluetooth or some other communication protocol whereby an SSID and password configuration can be provided to the DPS WiFi module so that it can connect to a WiFi access point. The WiFi module can host an HTTP Server in the module that can be utilized to update and change the various configuration options. In addition or instead, the WiFi module can communicate over the Internet utilizing an IoT platform. The connection can be handled intermittently using an IoT platform that has a backend Web application programming interface with access to a database. The frontend application(s) can be provided on various devices, such as laptops, mobile devices, and desktop computers. The frontend application can provide metrics and also the same (or different) options for configuration that are available to user locally via the hosted HTTP server on the WiFi module.

In essence, the website or frontend can be responsible for displaying the device configuration obtained through the web API or backend application, allowing changes to the configuration that can be stored and sent remotely to the device.

The API or backend application can be responsible for obtaining and storing information in a database and communicating with the IoT platform by sending information to devices through MQTT or HTTP messages.

The database can be configured to ensure the integrity and availability of the users and device data for the API or backend application.

The IoT platform can be configured to provide secure communication through MQTT or HTTP messages between devices and the API or backend application.

Graphics Event Trigger Criteria—Passive Mode

Figure 16:
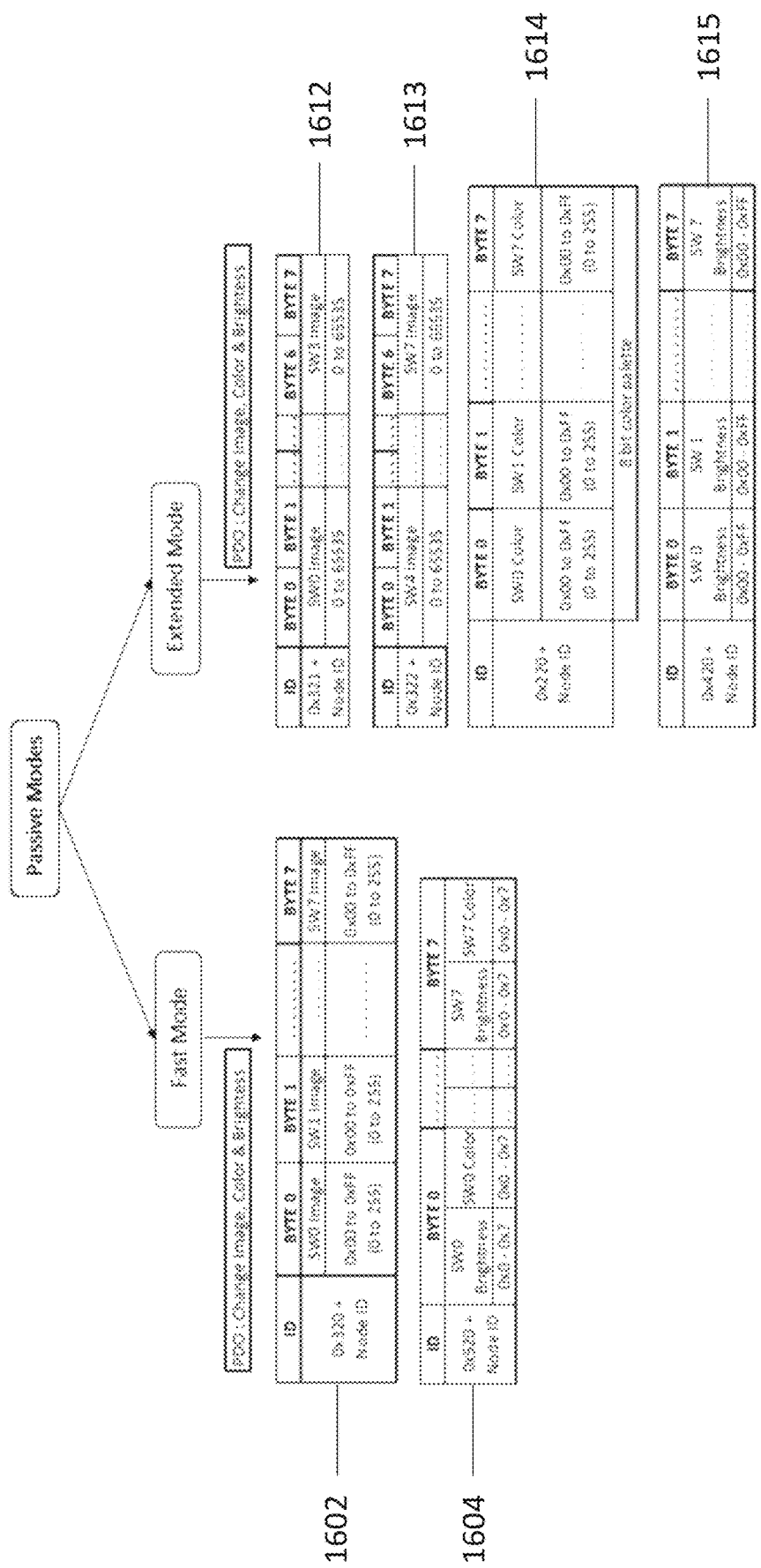
FIG. 16 illustrates exemplary fast mode and extended mode process data object (PDO) messages for CAN communication.

In the current embodiment, when the DPS is configured in passive mode, it can communicate in one of two sub-modes (fast mode and extended mode) as shown in FIG. 16. In the exemplary embodiment of FIG. 16 used throughout this section, the DPS includes eight display pushbuttons. In both fast mode and extended mode, the DPS can utilize process data object (PDO) messages to change the image, color, and/or brightness of each of the display pushbuttons. Throughout this section, the exemplary values listed in memory for each of the PDO messages represent an index where the particular value can be found rather than the actual address in memory of the particular value. The actual address in memory can be located as discussed above by calculating a memory offset based on the index (and the page number, if the DPS is configured with them).

The depicted function codes of the COB-IDs of the various PDO messages 1602, 1604, and 1612-1615 in FIG. 16 are merely exemplary default values. For example, the two Fast mode messages have the function codes 0x320 and 0x520, respectively. The COB-ID of messages sent with those function codes will vary based on the Node ID of the transmitting node, but the first four bits, in this embodiment, of the COB-ID dictate the function code that identifies the format of the PDO messages for the controller decoding the CAN data because it has separately been programmed according to a CAN object dictionary. For example, with regard to message 1602, the controller can properly decode the 8 bytes of data as relating to a sequence of one byte index values that index the up to 256 images stored in memory. The index can be utilized in combination with the pre-determined memory offset for image memory slots and a starting address of graphics memory to determine the specific memory address of an image associated with a specific index value. Further, the controller is configured by virtue of the object dictionary that the sequenced bytes correspond to SW0-SW7 and can utilize that information to intelligently access the images in memory and control their upload to the appropriate switches for a PDO update graphics command, such as 1602. The other PDO messages work similarly, but because they have a different COB-ID, the controller is programmed according to the entries relating to the corresponding function code (i.e. the first four bits of those COB-IDs). The function code of PDO messages 1612 and 1613 have been chosen as consecutive hex values (0x321 and 0x322) for organizational reasons because, as discussed below, in extended mode each switch is allocated two bytes and therefore two messages are used to transmit image indexes in extended mode.

Fast Mode

In fast mode, the DPS can change the image, color, and brightness of each of the display pushbuttons using only two PDO messages. The current status of the display pushbutton screens can be read using four SDO messages. Fast mode favors communication speed by packing information into a small number of messages.

A specific image can be set on a specific display pushbutton using the PDO message 1602. A significant space savings is realized by pre-defining byte slot associations with certain switches so that no addressing information needs to be communicated. As shown in FIG. 16, byte 0 through byte 7 each respectively represent switches 0 through 7, respectively. Upon receiving the PDO message, the DPS can calculate the memory address for each image to be updated on the respective switches. Each memory address can be calculated based on the pre-defined memory offset for images in memory on the DPS and the byte index corresponding to the switch being updated. With the memory addresses calculated, the images can be recalled in the memory at specific bytes. One byte, or eight bits, may be set aside for each image selection such that the DPS can recall any of the up to 255 images stored in memory accessible by fast mode. Any of the 255 images may be recalled and displayed on any of the display pushbuttons. The single PDO message 1602 can be used to set any of the 255 images on each of the display pushbuttons. Put another away, the single PDO message 1602 can command the DPS controller to change the image on all eight of the display pushbuttons.

The color and brightness of each display pushbutton can be changed together using one PDO message 1604. As with PDO message 1602, byte 0 through byte 7 of PDO message 1604 can represent the switches 0 to 7, respectively. When the DPS receives the PDO message 1604, the DPS can recall the particular color and brightness values stored in the memory at specific locations based on these values, e.g. using the byte index and a pre-determined offset. While each switch can be represented by one byte of data, the PDO message 1604 can split color and brightness information among that one byte. For example, in one embodiment, four bits are utilized to index color information and four bits are utilized to index brightness information. In another embodiment a two bit-six bit split can be implemented. The color and brightness bits can index different color and brightness settings or adjustments. The memory location of the color and brightness settings or adjustments can be calculated based on the indices and pre-defined brightness and color memory offsets. In alternative embodiments, instead of referencing brightness and color information in memory, the color and/or brightness data can reference particular color and/or brightness values or adjustments. Any suitable configuration of bits for brightness and color within the one byte allocated for each switch can be used in fast mode. The single PDO message 1604 can set the brightness and color for all eight switches.

The image, brightness, and color for each switch can be changed using two PDO messages. The PDO messages 1602, 1604 may each be assigned different IDs in memory. In the depicted embodiment of FIG. 16, the ID of PDO message 1602 is 0x320+Node ID and the ID of PDO message 1604 is 0x520+Node ID. Any other suitable ID can be used. When the DPS receives both the PDO messages 1602, 1604, the DPS can recall the particular image, brightness, and color and update the display pushbutton screens accordingly.

I. Extended Mode

In extended mode, the current embodiment of the DPS implements four PDO messages in its object dictionary to change the image, color, and brightness of each of the display pushbuttons. Using four PDO messages involves the exchange of more data for the same functionality as in fast mode. However, in extended mode, the DPS has more options for image, color, and brightness than in fast mode. The current status of the display pushbutton screens can be read using eight SDO images. In the current example, the DPS can utilize up to 65535 images and up to 255 color and brightness values.

Two PDO messages 1612, 1613 can be used to select images for each of the switches from 0 to 7. The PDO messages 1612, 1613 may each have their own ID. In the depicted embodiment, the ID of PDO message 1612 is 0x321+Node ID and the ID of PDO message 1613 is 0x322+Node ID. Each switch may be assigned two bytes of data in one of the PDO messages 1612, 1613 to accommodate a larger image selection. Put another way, two bytes of data may be allocated per image to allow a user to select one of 65535 images for each switch. In the depicted embodiment, each switch is assigned two consecutive bytes and the switches are arranged in incremental order. The bytes for each of the switches can be assigned in any other suitable pre-defined arrangement. When the DPS receives both PDO messages 1612, 1613, the DPS can recall the eight particular images stored in the memory at specific locations and can display the images on the display pushbuttons. Put another way, two messages are used to set a graphic on all eight switches.

As depicted in FIG. 16, Byte 0 and Byte 1 of PDO message 1612 represent switch 0 and the bytes and switch numbers consecutively increase such that Byte 6 and Byte 7 represent switch 3. The switch numbers continually increase in PDO message 1613 such that Byte 0 and Byte 1 represent switch 4 and Byte 6 and Byte 7 represent switch 7.

A PDO message 1614 can be used to set the color of each of the switches. Byte 0 through Byte 7 can represent the switches 0 to 7, respectively. Modifying the bits of any byte can result in changing the particular color on that particular switch. When the DPS receives PDO message 1614, the DPS can recall the particular colors stored in the memory and can display those colors on the display pushbuttons. In one embodiment, the color corresponding to each byte may use the standard 8-bit color palette such that each switch can use any one of 255 possible colors. In the depicted embodiment, the ID of the PDO message 1614 is 0x220+Node ID.

A PDO message 1615 can be used to set the brightness of each of the switches. Byte 0 through Byte 7 can represent the switches 0 to 7, respectively. By using one byte per switch, 255 different brightness levels are possible. When the DPS receives the PDO message 1615, the DPS can recall the particular brightness values stored in the memory and can display those brightness values on the display pushbuttons. In the depicted embodiment, the ID of the PDO message 1615 is 0x420+Node ID.

Feedback Event Trigger Criteria—Passive Mode

Throughout this section, examples will be used to illustrate one way the DPS may be configured to respond when a feedback event is triggered.

First, an initialization step may be performed so that the DPS can provide the correct status output to the network. This step can allow the DPS component to be read properly in any mode. In some situations the initialization can be skipped, for example, the DPS may be configured with default values making it unnecessary. The SDO message shown in FIG. 18 may be sent from the controller to determine whether Extended CAN ID or Standard CAN ID will be used. In the current embodiment, the CAN messages are sent utilizing the CANopen protocol with a COB-ID having the format <Function Code>+<Node ID>, as discussed above. In FIG. 18, the value 0x650 is a default function code for this particular SDO message, but in alternative implementations it could be a different value.

The first four bytes of the CAN data of this exemplary SDO message will now be discussed. The first byte of an SDO message generally indicates whether the operation with the subsequent four bytes relates to writing (e.g. providing configuration information) or reading (e.g. requesting information be sent back). In the current embodiment, this SDO message relates to writing configuration information. The next two bytes represent an object dictionary index of the data to be accessed, the fourth byte (byte 3) represents the sub-index of the object dictionary variable referenced by the index. The last four bytes (bytes 4-7) are the data. Rather, these bytes typically contain the data to be uploaded or the size of the data to be uploaded. In this case, byte 4 indicates whether future messages will be sent with Extended CAN ID or Standard CAN ID and provides the size of the relevant ID in the appropriate byte positioning as shown.

The SDO message in FIG. 19 may also be part of the initialization step. The frameID, and the first three bytes (byte 0-2) are all the same as described above with respect to FIG. 18. However, this message has a sub-index of 2. Accordingly, this is also a write message that references the same object index value in the CAN object dictionary. However, this sub-index relates to different configuration information. Specifically, byte 4 represents an Enable/Disable command that allows for three options. The first option is that the DPS will send the status only once when asked and corresponds to a value of 2. The second option is the DPS will send the status continuously when asked and corresponds to a value of 1. The third option disables the message transmission and corresponds to a value of 0. Byte 5 represents the transmission type. If Byte 5 has a value of 2, the DPS will transmit in fast mode. If Byte 5 has a value of 1, the DPS will transmit in extended mode. Bytes 6 and 7 represent the transmission rate in milliseconds.

The DPS can receive requests for status or feedback and communicate its status to a CAN-side DPS control CAN node. With respect to FIG. 20, an exemplary pair of SDO messages for requesting and providing the current switch status, current page number, current status of the rotary encoder, and current status of the light sensor in terms of a LUX value is shown. Essentially, data values can be polled via the SDO message with one COB-ID and the answers transmitted on the bus using another COB-ID. The transmit and receive function codes relating to the same SDO can be paired so that the transmit and receive COB-IDs of the same SDO (or PDO) are identifiable. One of the COB-IDs in the table below is 0x580+Node ID, typically the SDO transmit COB-ID (from the perspective of the DPS). The request (i.e. SDO Receive) typically would have a COB-ID of 0x600+Node ID. However, as discussed above, the COB-ID values can essentially be arbitrary values, but the function codes and Node IDs that make up the COB-IDs can be selected based on some organizational criteria. In this SDO message, the operation is a read operation relating to the same CAN object, but with reference to sub-index 3, which represents information relating to the current state of the switches (byte 4, one bit per switch), the page number (five bits of byte 5), the rotary state (the remaining three bits of byte 5), and the light sensor value (12 bits spread over bytes 6-7). Put simply, byte 4 represents the switch states wherein each bit corresponds to one of the switches. Byte 5 represents the page number and rotary encoder status, and Bytes 6 and 7 represent the light sensor value.

In FIG. 21, the four SDO messages that give the current status of the DPS (feedback) in fast mode are shown. The same structure as discussed above follows with respect to the COB-ID and CAN data for that SDO message applies here. In FIG. 21, each of the four SDO messages has a sub-index from 4 to 7. Sub-index 4 represents switches 0 to 3 and their images, respectively, and sub-index 5 represents switches 4 to 7 and their images, respectively. Sub-index 6 represents switches 0 to 3 and their brightness and color, respectively, and sub-index 7 represents switches 4 to 7 and their brightness and color, respectively. The ranges for images, color, and brightness are shown in FIG. 21. These messages are capable of obtaining the current status of 0 to 255 images, 0 to 7 colors, and 0 to 7 levels of brightness on any pages and on all eight display pushbuttons.

In FIG. 22, the eight SDO messages that give the current status of the DPS (feedback) in extended mode are shown. These messages have the same frame ID, operation, and object as described above with reference to FIG. 20. Sub-indexes 4 through 7 represent the switches 0 to 7 and their images, respectively, wherein each sub-index represents the images of two switches (e.g. sub-index 4 represents switches 0 to 1 and their images, respectively). Sub-index 8 represents the switches 0 to 3 and their colors, respectively, and sub-index 9 represents the switches 4 to 7 and their colors, respectively. Sub-index 10 represents the switches 0 to 3 and their brightness levels, respectively, and sub-index 11 represents the switches 4 to 7 and their brightness levels, respectively. These messages are capable of getting the current status of 0 to 65535 images, 0 to 255 colors, and 0 to 255 levels of brightness on any pages and on all eight display pushbuttons.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A vehicle controller area network (CAN) including a vehicle CAN bus and a plurality of vehicle function CAN nodes communicating physical values associated with the vehicle, the vehicle CAN comprising:
   a display pushbuttons system (DPS) including a plurality of display pushbuttons and a graphics memory configured to store a plurality of display pushbutton graphics at a plurality of memory addresses, and a DPS CAN transceiver configured to receive, decode, encode, and transmit CAN frames;
   event memory configured to store DPS update event trigger criteria and DPS update event information; and
   a controller configured to trigger a DPS update event based on a comparison between the DPS update event trigger criteria and physical values associated with the vehicle, wherein the controller is configured to select, in response to the DPS update event, one of the plurality of display pushbutton graphics stored in the graphics memory for each of the plurality of display pushbuttons based on the DPS update event information,
   wherein the controller is configured to initiate a graphics update of the plurality of display pushbuttons based on the selection, and
   wherein the controller is configured to initiate a request for a display pushbutton status from at least one of the plurality of display pushbuttons and receive the display pushbutton status as a result of the request.

2. The vehicle CAN of claim 1 including:
   a CAN-side DPS control CAN node in communication with the vehicle CAN bus, wherein the controller is integrated into the CAN-side DPS control CAN node, and wherein the CAN-side DPS control CAN node is configured to communicate with and control both the DPS, being configured in passive mode, and the vehicle function CAN nodes over the vehicle CAN bus.

3. The vehicle CAN of claim 1 wherein the DPS is configured in active mode, and wherein the event memory and the controller are integrated into the DPS.

4. The vehicle CAN of claim 1 wherein the DPS includes an ambient light sensor, the event memory is configured to store DPS brightness update event trigger criteria and DPS brightness update event information, wherein the controller is configured to trigger a DPS brightness update event based on a comparison between the DPS brightness update event trigger criteria and the ambient light sensor, wherein the controller is configured to determine, in response to the DPS brightness update event, a brightness level for each of the plurality of display pushbuttons based on the DPS brightness update event information, and wherein the controller is configured to initiate a brightness update of the plurality of display pushbuttons based on the determined brightness level.

5. The vehicle CAN of claim 1 wherein the event memory is configured to store DPS color update event trigger criteria and DPS color update event information, wherein the controller is configured to trigger a DPS color update event based on a comparison between the DPS color update event trigger criteria and physical values associated with the vehicle, wherein the controller is configured to determine, in response to the DPS color update event, a color value for each of the plurality of display pushbuttons based on the DPS color update event information, and wherein the controller is configured to initiate a color update of the plurality of display pushbuttons based on the determined color value.

6. The vehicle CAN of claim 1 including a rotary encoder disposed in the DPS, wherein in response to an amount of rotation of the rotary encoder the controller is configured to trigger a pair of command events based on the amount of rotation of the rotary encoder, wherein the controller initiates the pair of command events to (1) command a vehicle function CAN node to change a vehicle characteristic based on the amount of rotation of the rotary encoder; and (2) command the DPS to update a pushbutton graphic based on the amount of rotation of the rotary encoder.

7. The vehicle CAN of claim 1, wherein the display pushbutton status requested by the controller includes at least one of a page number of the display pushbutton system and whether at least one of the plurality of display pushbuttons was pressed.

8. The vehicle CAN of claim 1, wherein the display pushbutton status requested by the controller represents at least one of the pushbutton graphic presently displayed on the at least one of the plurality of display pushbuttons and a color presently displayed on at least one of the plurality of display pushbuttons.

9. The vehicle CAN of claim 1, wherein the display pushbutton status requested by the controller represents a brightness of at least one of a pushbutton graphic presently displayed on the at least one of the plurality of display pushbuttons and a color presently displayed on at least one of the plurality of display pushbuttons.

10. A method of operating a vehicle controller area network (CAN) including a vehicle CAN bus and a plurality of vehicle function CAN nodes communicating physical values associated with the vehicle, the method comprising:
providing a display pushbuttons system (DPS) including a plurality of display pushbuttons, a DPS graphics memory, and a DPS CAN transceiver;
storing, in the DPS graphics memory, a plurality of display pushbutton graphics at a plurality of memory addresses;
receiving, decoding, encoding, and transmitting CAN frames with the DPS CAN transceiver;
storing, in event memory, DPS update event trigger criteria and DPS update event information;
triggering a DPS update event based on a comparison between the DPS update event trigger criteria and physical values associated with the vehicle;
selecting, in response to the DPS update event, one of the plurality of display pushbutton graphics stored in the DPS graphics memory for each of the plurality of display pushbuttons based on the DPS update event information;
initiating a graphics update of the plurality of display pushbuttons based on the selection;
initiating a request for a display pushbutton status from at least one of the plurality of display pushbuttons; and
receiving the display pushbutton status as a result of the request.

11. The method of operating a vehicle CAN of claim 10 including:
configuring the DPS in passive mode;
providing a CAN-side DPS control CAN node, wherein the triggering, selecting, and initiating steps are performed by the CAN-side DPS control CAN node; and
configuring the CAN-side DPS control CAN node for communicating with and controlling both the DPS and the vehicle function CAN nodes over the vehicle CAN bus.

12. The method of operating a vehicle CAN of claim 10 including configuring the DPS in active mode, and wherein the event memory is accessible by the DPS and wherein the storing in event memory, triggering, selecting, and initiating steps are performed by the DPS.

13. The method of operating a vehicle CAN of claim 10 including:
providing an ambient light sensor;
storing, in event memory, DPS brightness update event trigger criteria and DPS brightness update event information;
triggering a DPS brightness update event based on a comparison between the DPS brightness update event trigger criteria and the ambient light sensor;
determining, in response to the DPS brightness update event, a brightness level for each of the plurality of display pushbuttons based on the DPS brightness update event information; and
initiating a brightness update of the plurality of display pushbuttons based on the determined brightness level.

14. The method of operating a vehicle CAN of claim 10 including:
storing, in event memory, DPS color update event trigger criteria and DPS color update event information;
triggering a DPS color update event based on a comparison between the DPS color update event trigger criteria and physical values associated with the vehicle;
determining, in response to the DPS color update event, a color value for each of the plurality of display pushbuttons based on the DPS color update event information; and
initiating a color update of the plurality of display pushbuttons based on the determined color value.

15. The method of operating a vehicle CAN of claim 10 including:
receiving, via a DPS WiFi module, updated display pushbutton graphics; and storing the updated display pushbutton graphics in memory based on a fixed offset related to the plurality of memory addresses.

16. The method of operating a vehicle CAN of claim 10, further comprising receiving a page number of the display pushbutton system in response to the request for the display pushbutton status.

17. The method of operating a vehicle CAN of claim 10, further comprising receiving the display pushbutton status indicating at least one of the plurality of display pushbuttons was pressed in response to requesting the display pushbutton status.

18. The method of operating a vehicle CAN of claim 10, further comprising receiving the display pushbutton status representing at least one of the pushbutton graphic presently displayed on the at least one of the plurality of display pushbuttons and a color presently displayed on at least one of the plurality of display pushbuttons.

19. The method of operating a vehicle CAN of claim 10, further comprising receiving the display pushbutton status representing a brightness of at least one of a pushbutton graphic presently displayed on the at least one of the plurality of display pushbuttons and a color presently displayed on at least one of the plurality of display pushbuttons.

* * * * *